(12) United States Patent
Chen

(10) Patent No.: US 11,947,063 B2
(45) Date of Patent: Apr. 2, 2024

(54) METHOD OF CONDITIONING SEISMIC DATA FOR FIRST-BREAK PICKING USING NONLINEAR BEAMFORMING

(71) Applicant: SAUDI ARABIAN OIL COMPANY, Dhahran (SA)

(72) Inventor: Yong Qing Chen, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 168 days.

(21) Appl. No.: 17/731,571

(22) Filed: Apr. 28, 2022

(65) Prior Publication Data
US 2023/0350090 A1 Nov. 2, 2023

(51) Int. Cl.
*G01V 1/34* (2006.01)
*G01V 1/28* (2006.01)

(52) U.S. Cl.
CPC ............... *G01V 1/345* (2013.01); *G01V 1/282* (2013.01); *G01V 2210/1295* (2013.01); *G01V 2210/1425* (2013.01); *G01V 2210/74* (2013.01)

(58) Field of Classification Search
CPC .......... G01V 1/345; G01V 1/282; G01V 1/30; G01V 1/301; G01V 1/303; G01V 1/307; G01V 2200/00; G01V 2210/12; G01V 2210/1295; G01V 2210/1425; G01V 2210/74; G01V 1/34; G01V 1/00; G01V 1/001; G01V 1/003; G01V 1/24; G01V 1/28

See application file for complete search history.

(56) References Cited

U.S. PATENT DOCUMENTS

| | | | |
|---|---|---|---|
| 5,073,876 | A | 12/1991 | Propes |
| 5,181,171 | A | 1/1993 | McCormack et al. |
| 9,103,935 | B2 | 8/2015 | Mousa et al. |
| 11,073,631 | B2 | 7/2021 | Colombo et al. |

(Continued)

OTHER PUBLICATIONS

Bakulin, Andrey et al., "Nonlinear beamforming for enhancement of 3D prestack land seismic data"; GEOPHYSICS; vol. 85, Issue 3; pp. V283-V296; May-Jun. 2020 (14 pages).

*Primary Examiner* — Daniel L Murphy
*Assistant Examiner* — Amie M Ndure
(74) *Attorney, Agent, or Firm* — Osha Bergman Watanabe & Burton LLP

(57) ABSTRACT

A method and system for picking first-break times for a seismic dataset are disclosed. The method includes generating a pre-processed seismic dataset and an initial refraction velocity model from the pre-stack seismic dataset and generating a first-break energy-enhanced seismic dataset using nonlinear beamforming applied to the pre-processed seismic dataset and the initial refraction velocity model. The methods further include estimating a refined refraction velocity model from the first-break energy-enhanced seismic dataset, and generating a post-processed seismic dataset from the refined refraction velocity model and first-break energy-enhanced seismic dataset. The methods still further include, for each pre-stack trace, determining a first-break time from the post-processed seismic dataset and the refined refraction velocity model. The methods also include generating a seismic image based on the first-break time for each pre-stack trace and determining a location of a hydrocarbon reservoir based on the seismic image.

20 Claims, 18 Drawing Sheets

(56) References Cited

U.S. PATENT DOCUMENTS

| | | | |
|---|---|---|---|
| 11,143,776 B2 | 10/2021 | Zhou et al. | |
| 11,194,069 B2 | 12/2021 | Walker | |
| 2009/0048784 A1* | 2/2009 | Matson | G01V 1/364 702/14 |
| 2010/0039894 A1* | 2/2010 | Abma | G01V 1/005 367/52 |
| 2015/0331123 A1* | 11/2015 | Guigné | G01V 1/34 702/16 |
| 2021/0116592 A1* | 4/2021 | Etgen | G01V 1/301 |
| 2021/0208298 A1 | 7/2021 | Vu | |
| 2021/0389485 A1* | 12/2021 | Xiao | G01V 99/005 |

\* cited by examiner

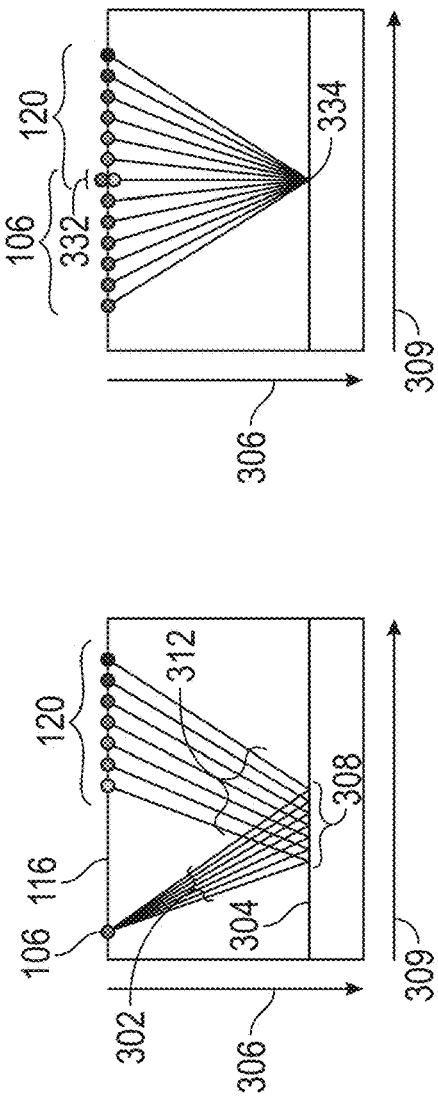
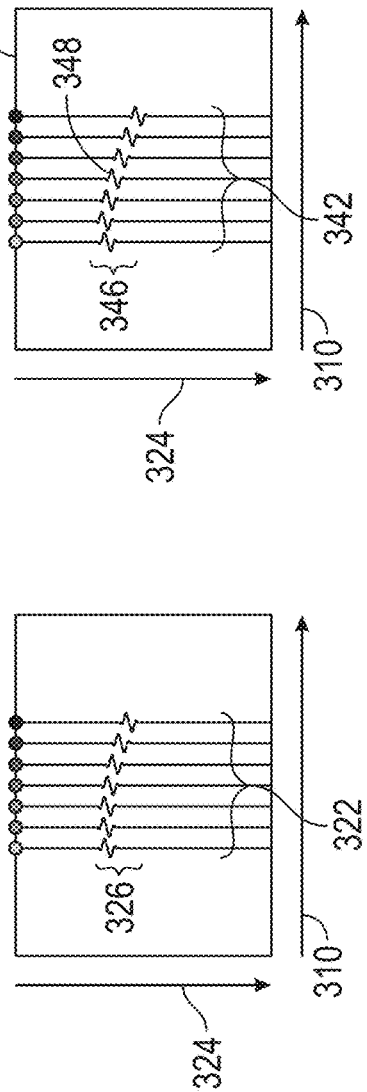
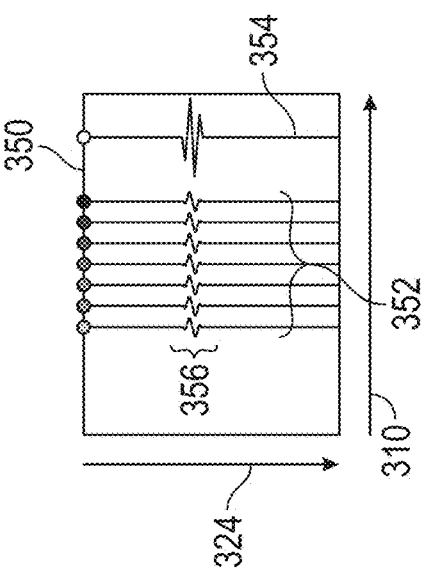
FIG. 3A
FIG. 3B
FIG. 3C
FIG. 3D
FIG. 3E

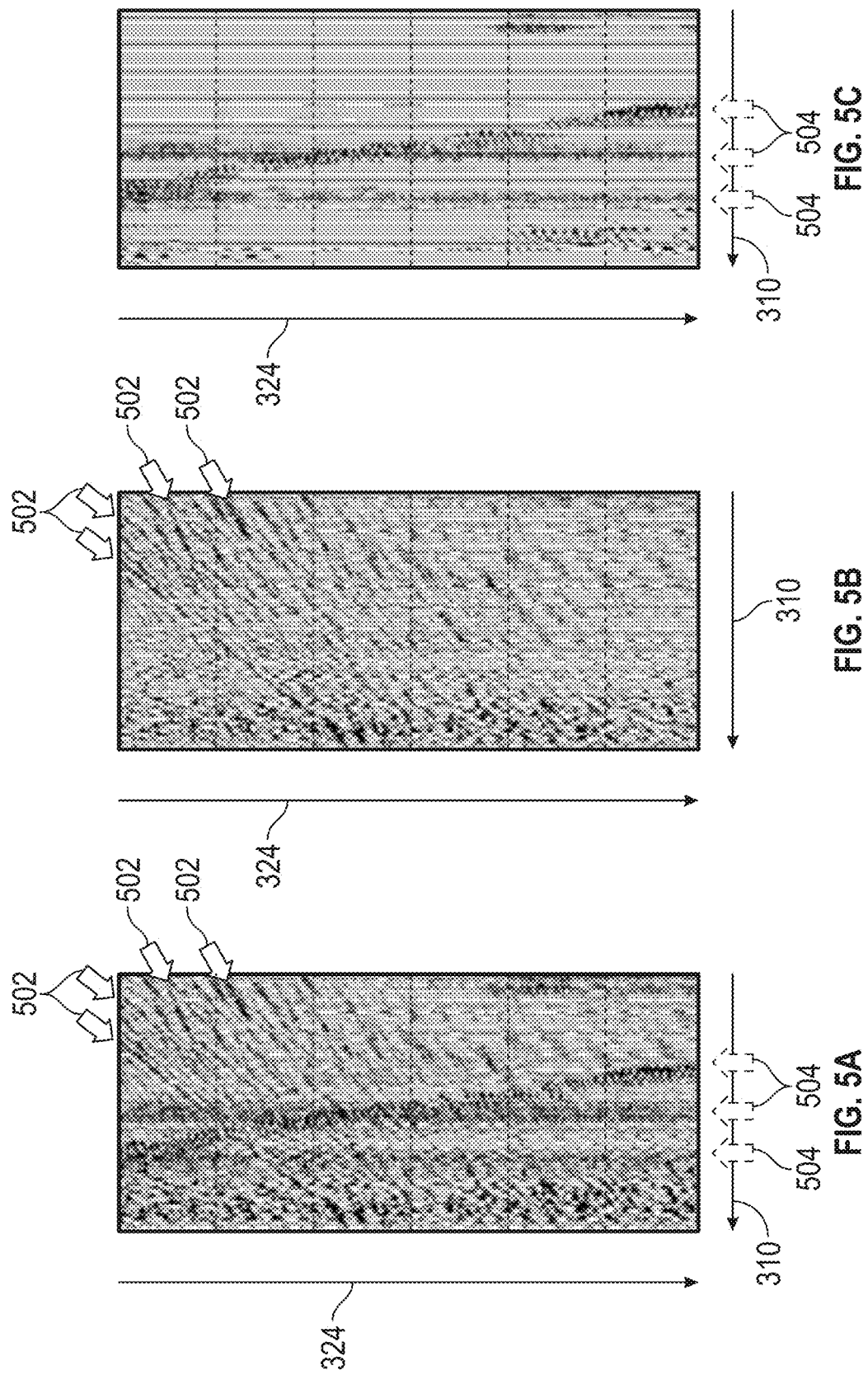

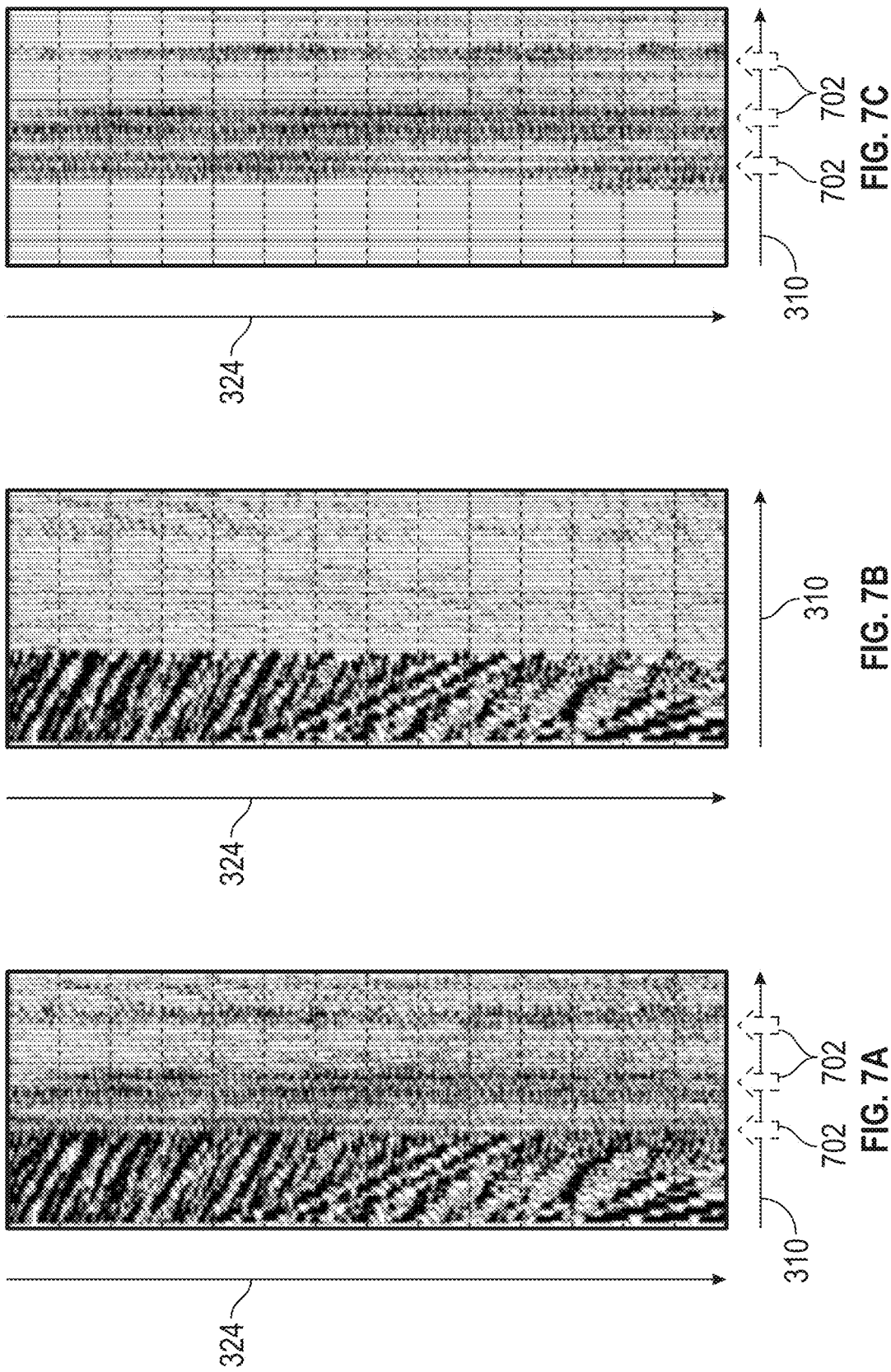

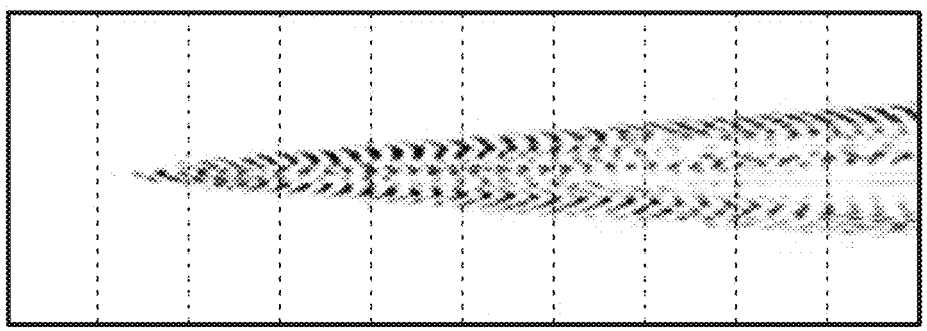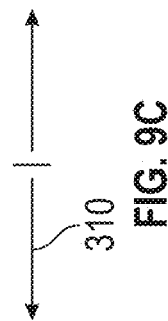
FIG. 9C
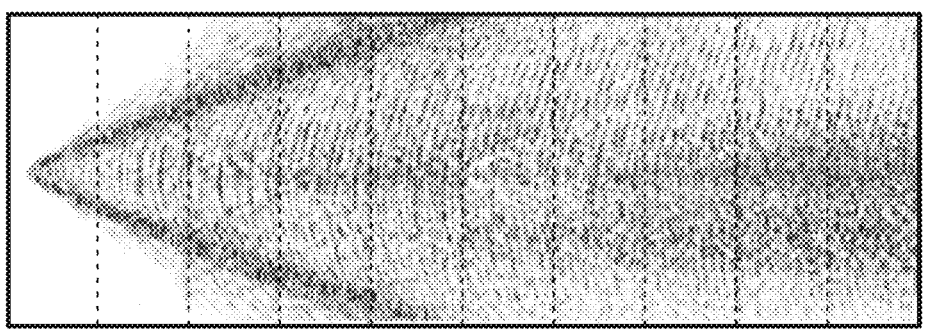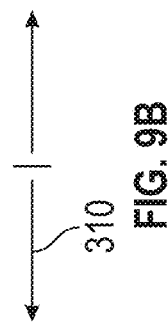
FIG. 9B
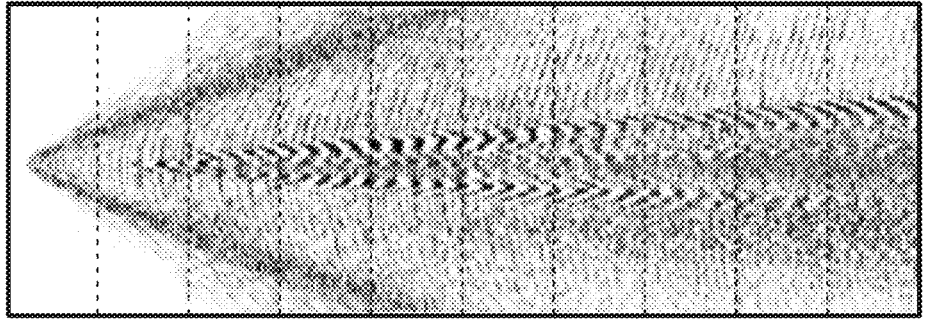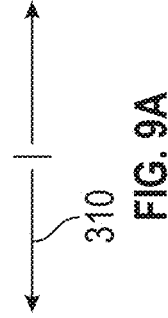
FIG. 9A

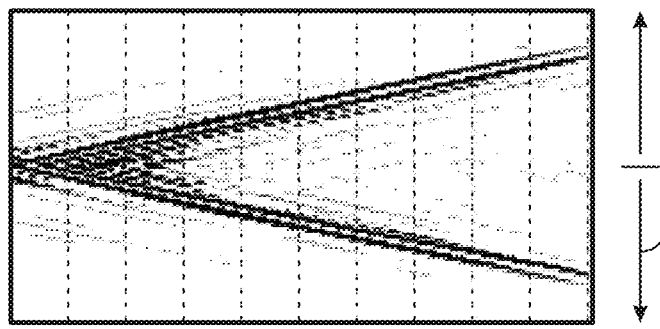
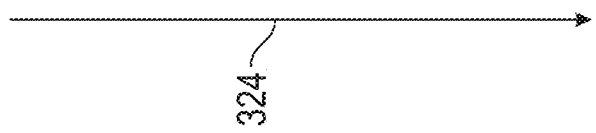
FIG. 10C
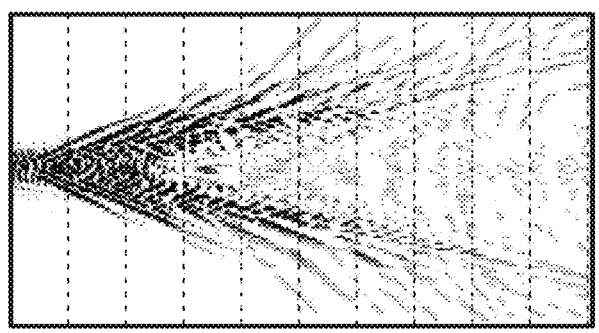
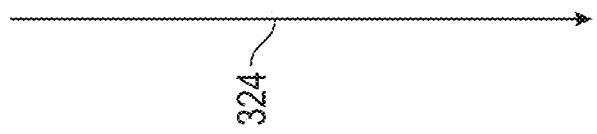
FIG. 10B
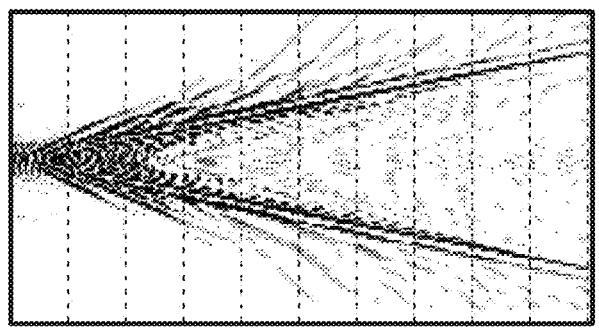
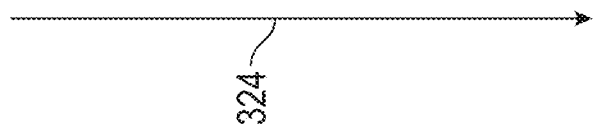
FIG. 10A

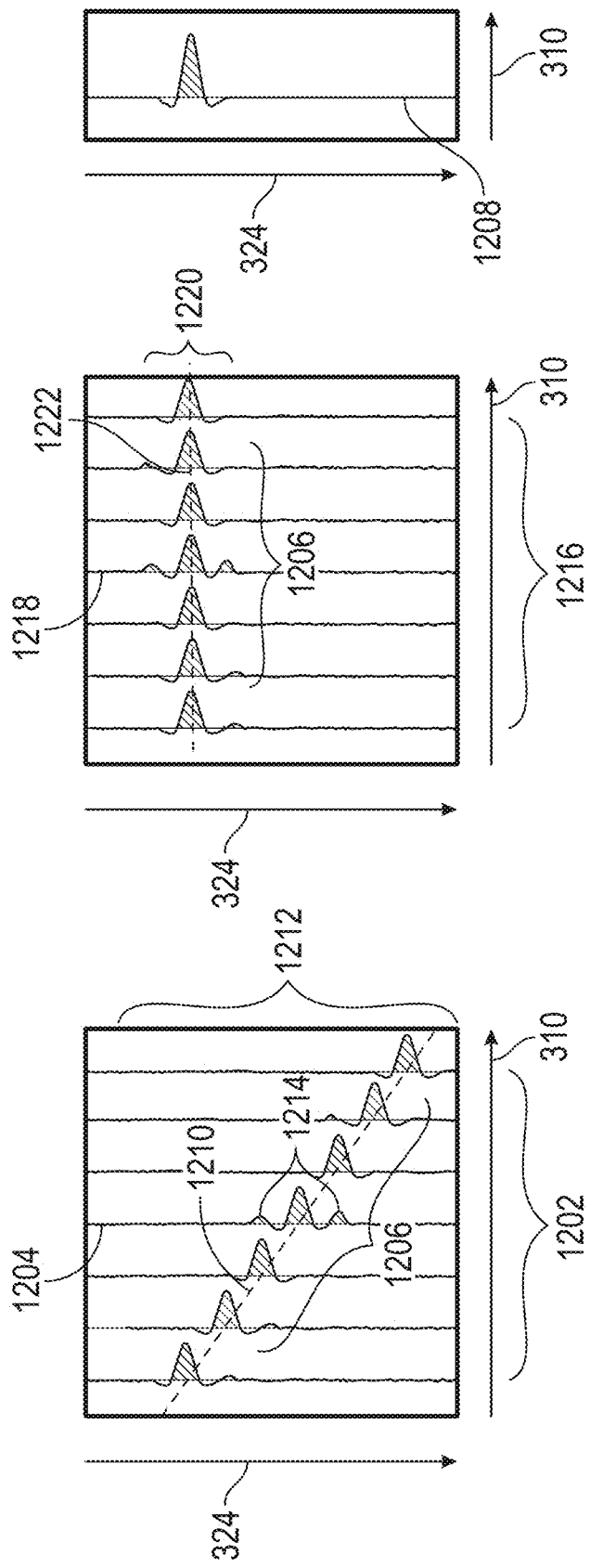

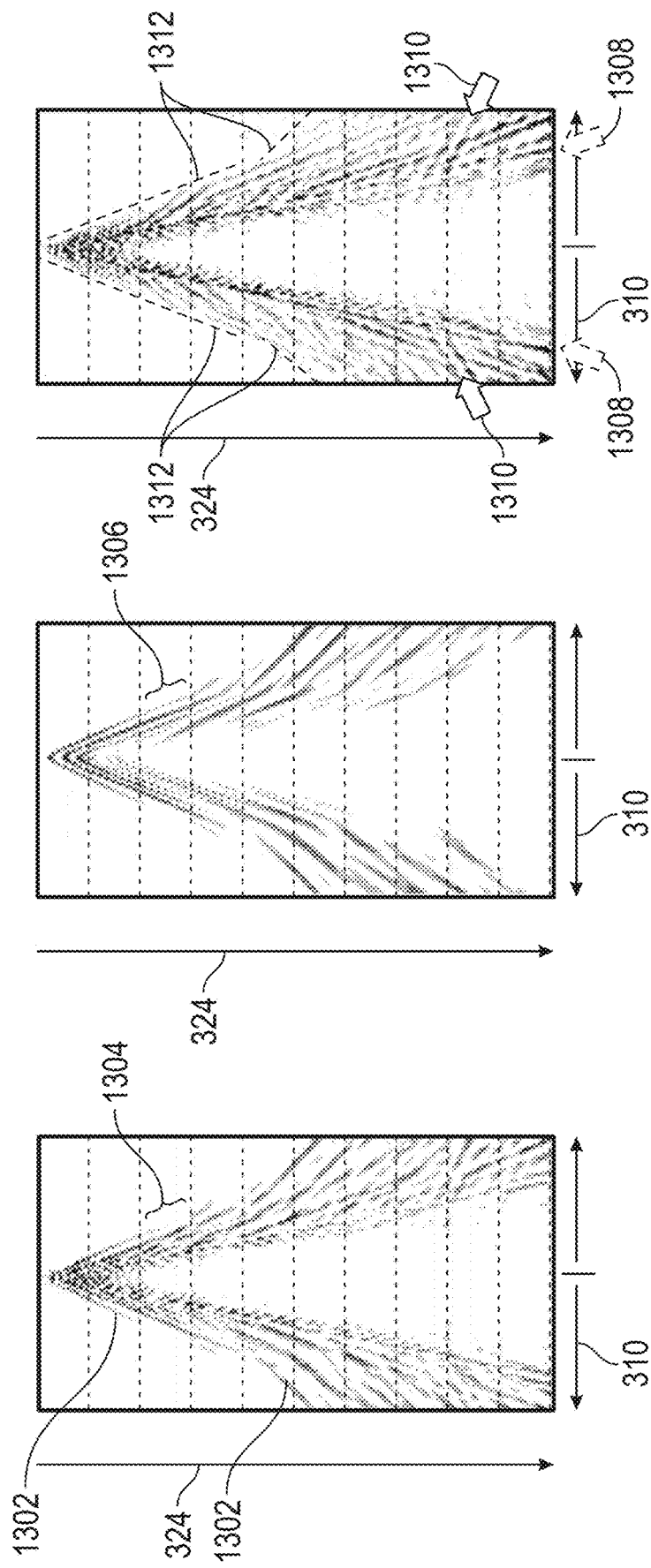

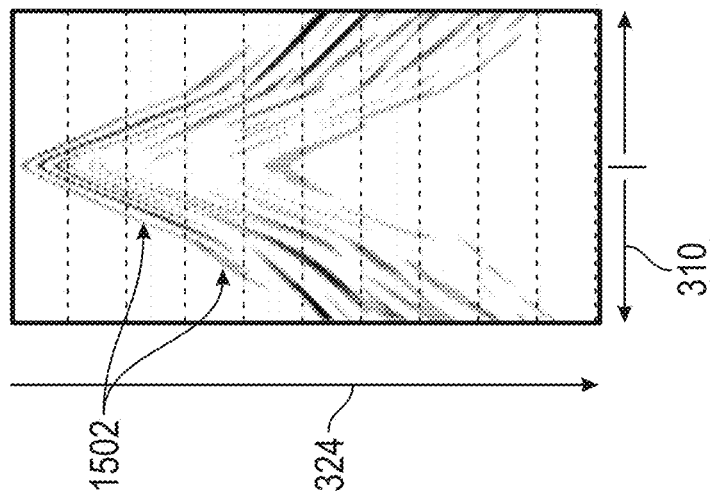
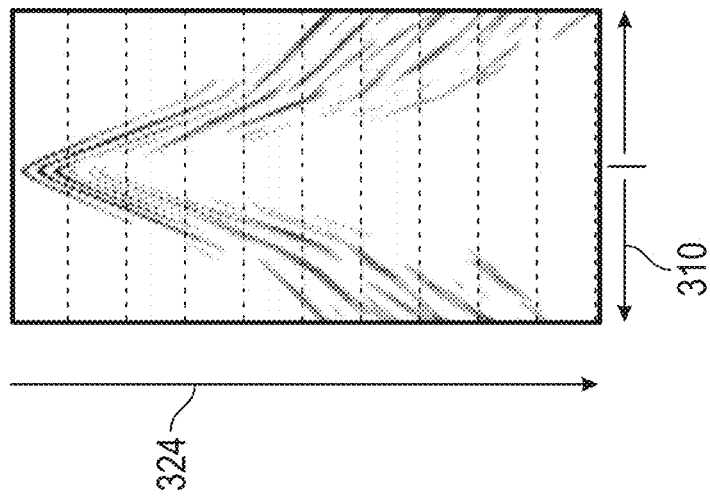

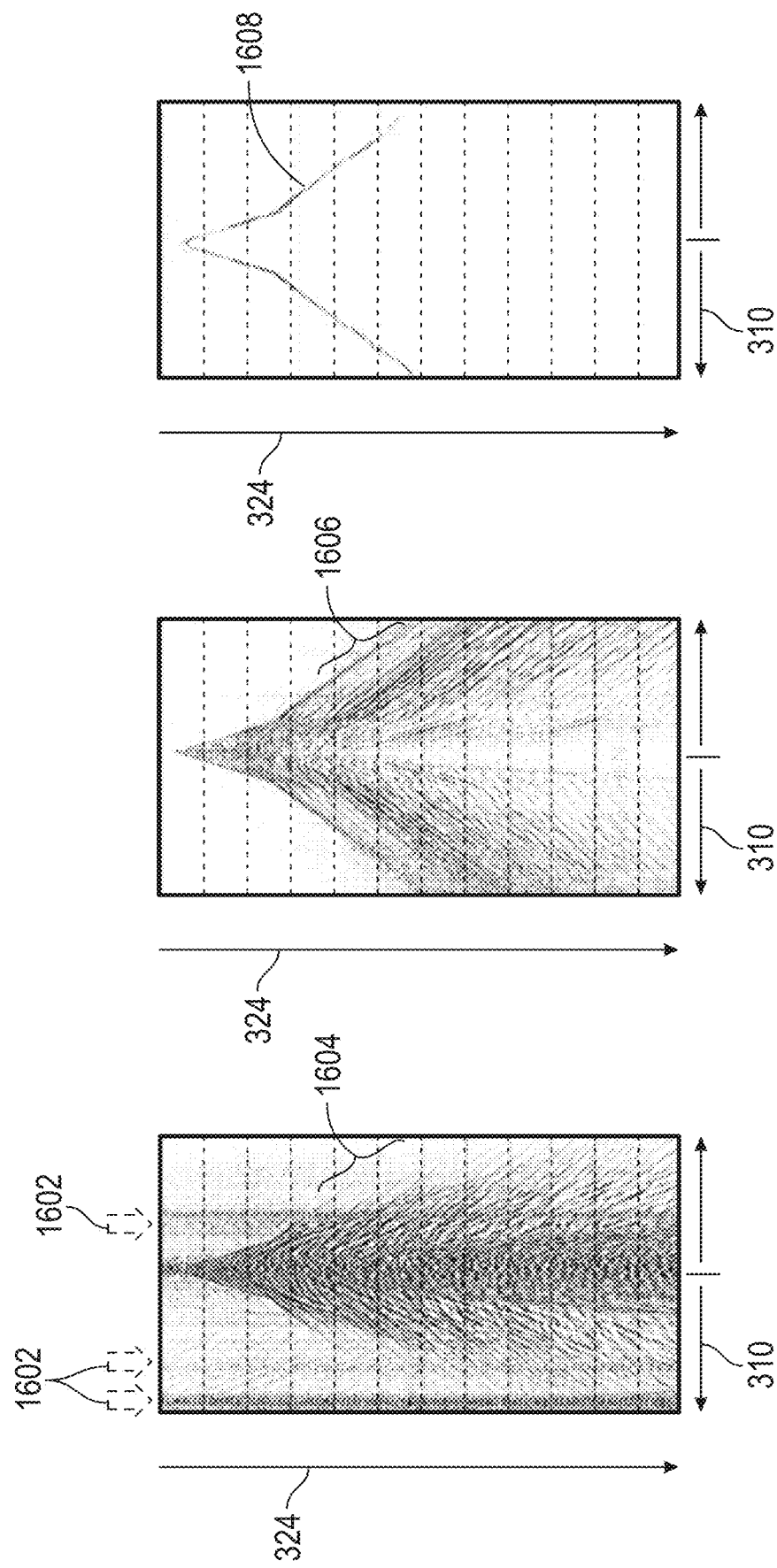

METHOD OF CONDITIONING SEISMIC DATA FOR FIRST-BREAK PICKING USING NONLINEAR BEAMFORMING

BACKGROUND

In the oil and gas industry, seismic surveys may be used to image the subsurface and these images may be used in the search for oil and gas reservoirs. The seismic data acquired by seismic surveys must typically be processed to form an image of the subsurface. A first-break time, i.e., the time at which the first pulse of seismic energy arrives at a receiver, holds information useful in numerous processing steps. In particular, the first-break time may be used in common seismic processing steps, such as static corrections and seismic velocity modeling.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments disclosed herein relate to methods for picking first-break times for a seismic dataset. The methods include generating a pre-processed seismic dataset and an initial refraction velocity model from the pre-stack seismic dataset. The methods also include generating a first-break energy-enhanced seismic dataset using nonlinear beamforming from the pre-processed seismic dataset and the initial refraction velocity model. The methods further include estimating a refined refraction velocity model from the first-break energy-enhanced seismic dataset, and generating a post-processed seismic dataset from the refined refraction velocity model and first-break energy-enhanced seismic dataset. The methods still further include, for each pre-stack trace, determining a first-break time from the post-processed seismic dataset and the refined refraction velocity model. The methods also include generating a seismic image based on the first-break time for each pre-stack trace and determining a location of a hydrocarbon reservoir based on the seismic image.

In general, in one aspect, embodiments disclosed herein relate to a non-transitory computer readable medium storing instructions executable by a computer processor, the instructions including functionality for generating a pre-processed seismic dataset and an initial refraction velocity model from the pre-stack seismic dataset. The instructions include generating a first-break energy-enhanced seismic dataset using nonlinear beamforming from the pre-processed seismic dataset and the initial refraction velocity model. The instructions further include estimating a refined refraction velocity model from the first-break energy-enhanced seismic dataset, and generating a post-processed seismic dataset from the refined refraction velocity model and first-break energy-enhanced seismic dataset. The instructions still further include, for each pre-stack trace, determining a first-break time from the post-processed seismic dataset and the refined refraction velocity model. The instructions also include generating a seismic image based on the first-break time for each pre-stack trace and determining a location of a hydrocarbon reservoir based on the seismic image.

In general, in one aspect, embodiments relate to a system, including a seismic acquisition system and a seismic processor. The seismic processor is configured to generate a pre-processed seismic dataset and an initial refraction velocity model from the pre-stack seismic dataset. The seismic processor is also configured to generate a first-break energy-enhanced seismic dataset using nonlinear beamforming from the pre-processed seismic dataset and the initial refraction velocity model. The seismic processor is further configured to estimate a refined refraction velocity model from the first-break energy-enhanced seismic dataset, and generate a post-processed seismic dataset from the refined refraction velocity model and first-break energy-enhanced seismic dataset. The seismic processor is still further configured to, for each pre-stack trace, determine a first-break time for each pre-stack trace from the post-processed seismic dataset and the refined refraction velocity model. The seismic processor is also configured to generate a seismic image based on the first-break time and determine a location of a hydrocarbon reservoir based on the seismic image.

Other aspects and advantages of the claimed subject matter will be apparent from the following description and the appended claims.

BRIEF DESCRIPTION OF DRAWINGS

FIGS. 3A-3E show schematic representations of seismic waveforms and ray paths in accordance with one or more embodiments.

FIGS. 5A-5C show seismic datasets in accordance with one or more embodiments.

FIGS. 7A-7C show seismic datasets in accordance with one or more embodiments.

FIGS. 9A-9C show seismic datasets in accordance with one or more embodiments.

FIGS. 10A-10C show seismic datasets in accordance with one or more embodiments.

FIGS. 12A-12C show schematic representations of beamforming in accordance with one or more embodiments.

FIGS. 13A-13C show an example of beamforming in accordance with one or more embodiments.

FIGS. 15A and 15B show an example of post-processing in accordance with one or more embodiments.

FIGS. 16A-16C show seismic datasets in accordance with one or more embodiments.

DETAILED DESCRIPTION

Figure 1:
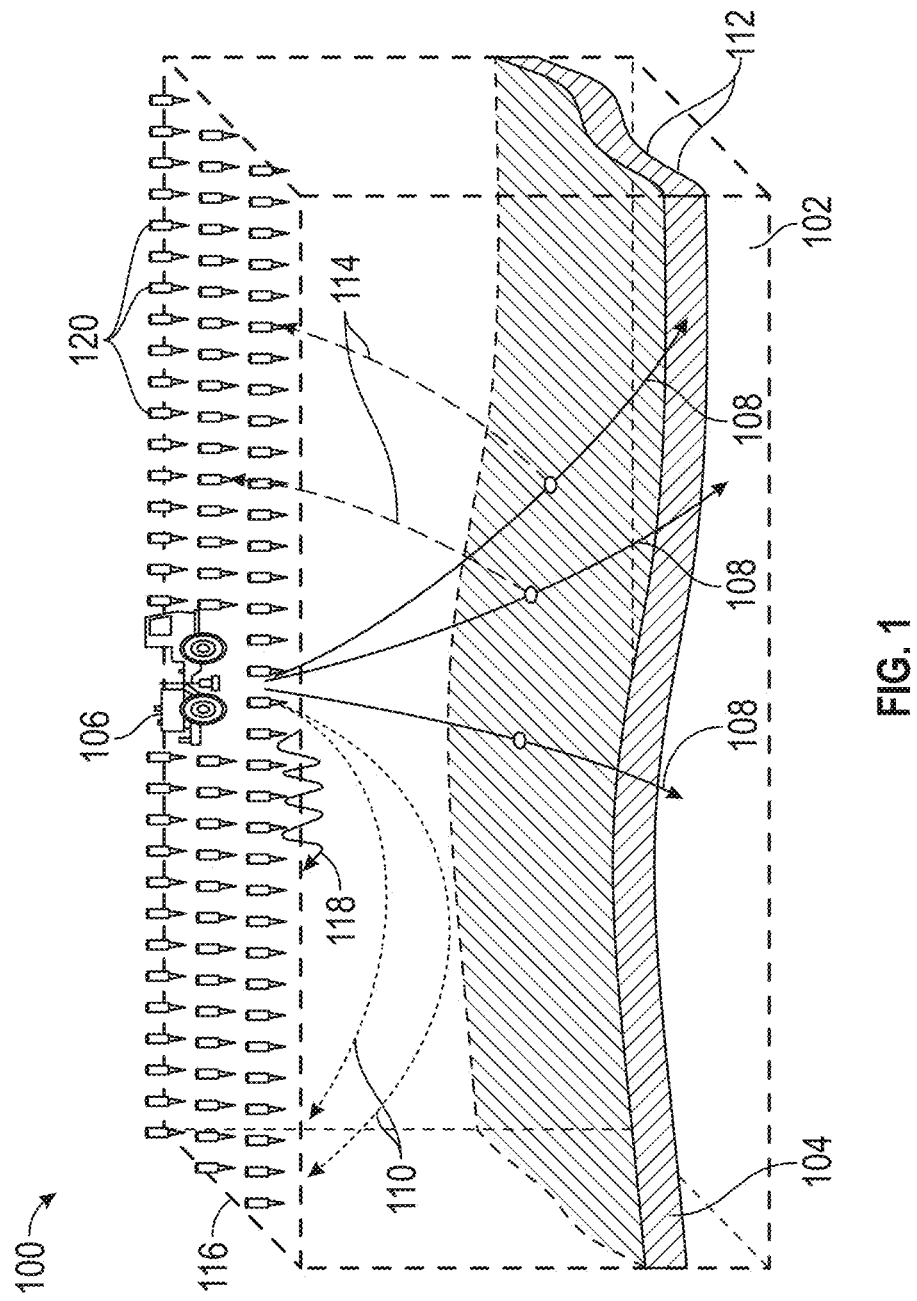
FIG. 1 depicts a seismic survey in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Processed seismic data may be used to locate hydrocarbon reservoirs and drilling targets. First-break energy holds information, particularly first-break times, that may be valuable to multiple stages of a seismic processing flow. Producing a reliable image of the subsurface using first-break times requires a first-break picking method to be accurate and robust in the presence of commonly encountered noise. For almost all modern seismic surveys, the volume of recorded data makes manual picking of first-break times infeasible. Existing automatic first-break picking methods, particularly those operating on a trace by trace basis, frequently give unsatisfactory results for noisy data, particularly noisy land data. For example, in land data the coupling between the seismic recorder and the ground may vary significantly from receiver to receiver, either because of faulty deployment or because of rapidly varying ground surface conditions, e.g., rock outcrop, gravel, compacted sand, uncompacted sand, and water saturated uncompacted sand. In other examples, the seismic data may be corrupted by anthropogenic acoustic noise, for example generated by traffic or oilfield machinery, or anthropogenic electric noise, for example radiated from nearby powerlines. In still further case, seismic data may be corrupted by surface winds shaking the housing of seismic receivers. Existing methods for picking first breaks, whether automatically or manually, may fail when applied to noisy seismic data because of the presence of rapidly varying signal amplitudes and noise characteristics.

Accordingly, embodiments of the present disclosure relate to conditioning seismic data for first-break picking in order to improve accuracy and reliability of automatic picking results. Beamforming is disclosed as a method for combining adjacent seismic traces to improve first-break picking results used in generating a seismic image. Furthermore, methods are disclosed for determining and drilling wellbore paths based on the seismic image.

FIG. 1 shows an example of a seismic survey (100) of a subterranean region of interest (102) containing a reservoir (104). The seismic survey (100) may use a seismic source (106) that generates radiated seismic waves (108). In a land environment, the seismic source (106) may be a dynamite source or one or more seismic vibrators (e.g., a "vibroseis truck"). In a marine or lacustrine environment, the seismic source (106) may be an air gun. The radiated seismic waves may be recorded by a plurality of seismic receivers (120). A single activation of the seismic source (106) may be recorded by tens or hundreds of thousands of seismic receivers (120). Typically, in a land environment, the seismic receiver may record the velocity or acceleration of ground motion, while in a marine or lacustrine environment the seismic receiver may record pressure fluctuations caused by the seismic waves.

The radiated seismic waves (108) may propagate along the ground surface (116) as surface waves ("ground-roll") (118). The radiated seismic waves may also propagate below the surface (116) and return as refracted seismic waves (110) or may be reflected one or more times by geological discontinuities (112) and return to the surface as reflected seismic waves (114).

The data collected by the seismic receivers (120) is referred to as a seismic dataset. A seismic dataset must be processed to produce valuable information, such as one or more seismic images or one or more seismic attributes. Typically, a seismic processing workflow addresses a sequence of steps including noise attenuation, acquisition regularization, multiple identification and attenuation, seismic wave propagation velocity determination, seismic imaging, and seismic attribute determination. Several of these steps, such as seismic imaging and seismic attribute attenuation, require further interpretation to identify the locations within the subsurface at which hydrocarbon accumulations may be present. In some embodiments, the interpretation may occur after the generation of the post-stack seismic image or the seismic attribute. In other embodiments, the interpretation may be performed in parallel or interleaved or integrated into the process of determining the post-stack seismic image or the seismic attribute.

Figure 2:
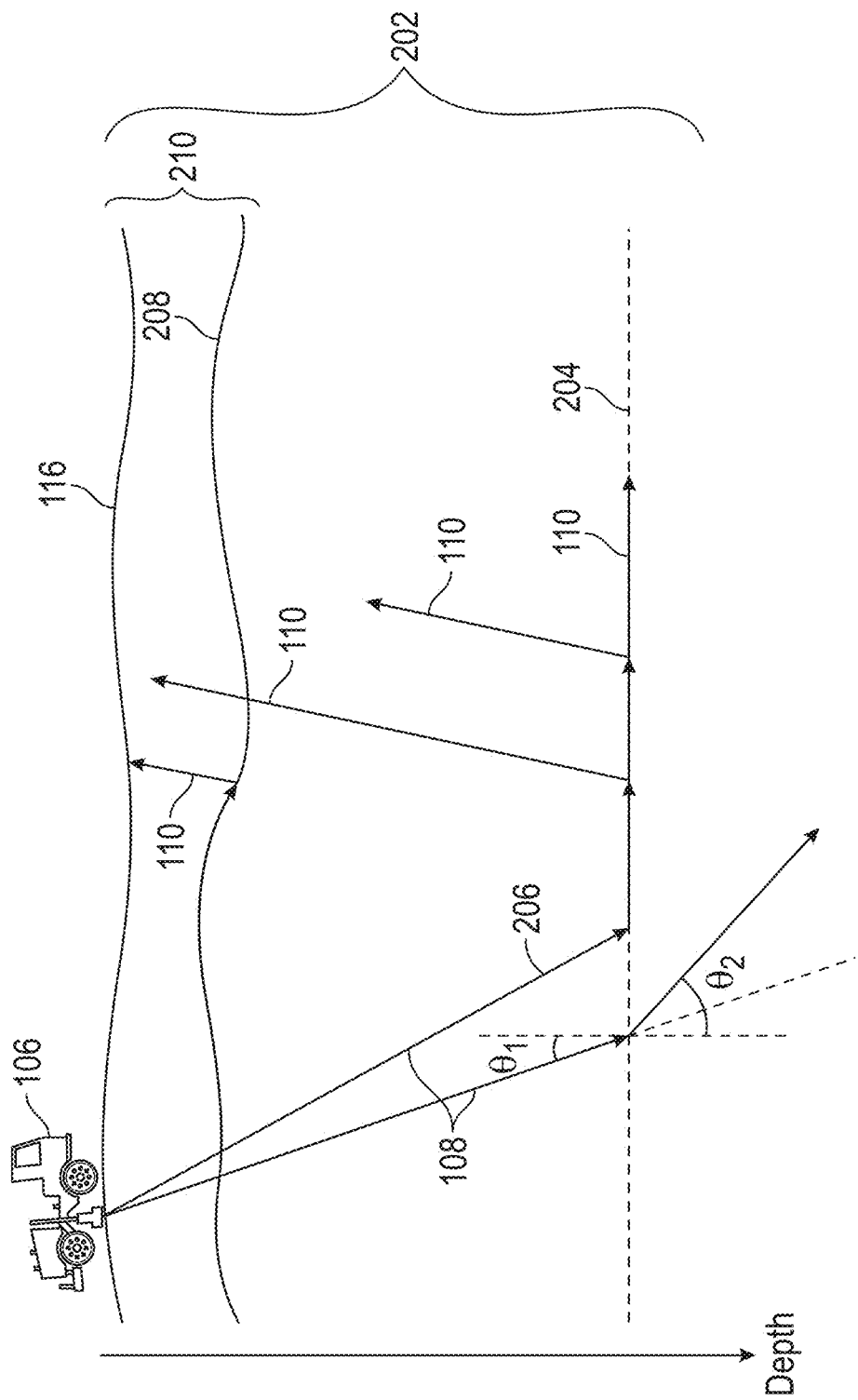
FIG. 2 shows systems in accordance with one or more embodiments.

FIG. 2 shows the radiated seismic wave (108) traveling through the subsurface of the earth (202). Refracted seismic waves (110) follow a geophysical principle governed by Snell's Law of refraction, which relates the angle of incidence and refraction of waves passing through a boundary between two layers. The law states that the ratio of the sines of the angles of incidence and refraction at the boundary between the two layers is equivalent to the ratio of the velocities of the two layers:

$$\frac{\sin\theta_2}{\sin\theta_1} = \frac{v_2}{v_1} \qquad \text{Equation (1)}$$

where $\theta_1$ and $\theta_2$ are the angles of incidence and refraction measured from the normal of the boundary (204), respectively. The seismic velocity above the boundary (204) is denoted $v_1$ and the seismic velocity below the boundary (204) is denoted $v_2$. The critical angle (206) of incidence is the angle at which a refracted wave (110) travels along the seismic reflector (204) or boundary between the two layers, with $v_1 < v_2$.

Refracted seismic waves (110) contain information used in certain steps of the seismic processing workflow; particularly, the onset of refracted seismic waves (110) that travel along the near-surface interface (208) before passing through the near-surface layer (210). First-break energy is the earliest arrival of energy propagated from the seismic source to the seismic receiver. Near-surface seismic wave propagation velocity models may be estimated using the first-break times of the refracted seismic waves (110), and static corrections require knowledge of the velocities of the near-surface layer (210).

Measuring the first-break time can be difficult, especially in seismic data recorded on land ("land seismic data") where the signal-to-noise ratio is typically lower than in seismic data recorded in the ocean ("marine seismic data"). Land seismic data is affected by complex near-surface geology including rugged topography and overburden heterogeneity. Wave-propagated noise is recorded above and generated within the complex near-surface layer, for example, direct waves, Rayleigh waves, and near-surface scattered waves. Recorded ambient noise may destructively interfere with recorded seismic signal throughout the seismic record, including across the onset of first-break energy. This destructive seismic interference may make it difficult to distinguish the onset of first-break energy and result in unreliable picks of the first-break times for some of the seismic traces.

Another issue concerning first-break picking is the number of seismic traces within a seismic survey requiring first-break times. Even smaller 3D seismic surveys can generate as many as ten million seismic traces, so manual picking and verification of first-break picking results may not be feasible. There exist methods for automatic picking, including artificial intelligence and machine learning techniques, however the quality of the first-break picking results often hinge on the signal-to-noise ratio of the input seismic data.

Referring back to FIG. 1, in some embodiments, the ground-roll (118), refracted seismic waves (110), and reflected seismic waves (114) generated by a single activation of the seismic source (106) are recorded by the seismic receivers (120) as a time-series representing the amplitude of ground-motion at a sequence of discrete times. This time-series may be denoted a seismic "trace". The seismic receivers (120) are positioned at a plurality of seismic receiver locations which we may denote $(x_r, y_r)$ where x and y represent orthogonal axes on the earth's surface above the subterranean region of interest (102). Thus, the refracted seismic waves (110) and reflected seismic waves (114) generated by a single activation of the seismic source (106) may be represented as a three-dimensional "3D" volume with axes $D(t, x_r, y_r)$ where $(x_r, y_r)$ represents the location of the seismic receiver (120) and t denotes the time series at which the amplitude of ground-motion was measured. However, a seismic survey (100) may include recordings of seismic waves generated by a seismic source (106) that is positioned at a plurality of seismic source locations denoted $(x_s, y_s)$. Thus, the seismic volume for a seismic survey (100) may be represented as a five-dimensional volume, denoted $D(t, x_r, y_r, x_s, y_s)$, where $(x_r, y_r)$ are vectors of seismic receiver locations along the x- and y-axes, and $(x_s, y_s)$ are vectors of seismic source locations along the x- and y-axes.

FIGS. 3A-3E depict seismic data at various stages of seismic processing in accordance with one or more embodiments. FIG. 3A depicts seismic waves (302) radiating from a seismic source location, reflecting from a seismic reflector (304) at a depth indicated by the vertical axis (306) and a plurality of horizontal reflection points (308), propagating as seismic reflections (312) back to the surface (116) and being recorded by an array of seismic receivers (120) covering a distance from a fixed point on the earth indicated by the horizontal axis (309).

FIG. 3B shows the plurality of seismic traces (322) recorded by the array of seismic receivers (120). These seismic traces (322), originating from a single seismic source location $(x_s, y_s)$, may be denoted $D(t, x_r, y_r, x_s, y_s)$ and may be called a "source gather" or a "shot gather". The seismic reflections (326) may be detected on traces within a shot gather at increasing two-way travel times, indicated by the vertical axis (324), as the offset (310) of the detecting receiver increases. The phenomenon is often called "moveout".

FIG. 3C shows an alternative sorting of the seismic dataset. In FIG. 3C the seismic sources (106) and the seismic receivers (120) are arranged to have a common midpoint (332). Such an arrangement may be called a "common midpoint gather". In many cases, a common midpoint gather may be more convenient than a shot gather because the reflection point of the seismic waves occurs at the same point (334) on the seismic reflector for all traces in the common midpoint gather.

FIG. 3D shows the traces common midpoint gather (342). The traces in a common midpoint gather may be denoted $D(t, x_o+\bar{x}_m, y_o+\bar{y}_m, x_o-\bar{x}_m, y_o-\bar{y}_m)$ where $(\bar{x}_m, \bar{y}_m)$ is the location of the midpoint and $(\bar{x}_o, \bar{y}_o)$ are vectors of offsets in the x- and y-directions. The seismic reflections (346) in a midpoint gather also exhibit two-way travel time (348). The two-way travel time of seismic reflections (346) may be said to form a "pre-stack horizon" (342), $t_A(x_o+\bar{x}_m, y_o+\bar{y}_m, x_o-\bar{x}_m, y_o-\bar{y}_m)$.

FIG. 3E shows a pre-stack midpoint gather (350) after correction for two-way travel time moveout using a technique called normal moveout correction. After correction for two-way travel time moveout, all of the seismic reflections (356) from a single seismic reflector (304) arrive at the same time and the corrected seismic traces (352) may be summed ("stacked") to form a post-stack seismic trace (354). The post-stack seismic trace (354) may have a higher signal-to-noise ratio than traces in the midpoint gather (342).

FIG. 3E depicts a pre-stack midpoint gather after correcting for two-way travel time using a technique called normal moveout correction. However, this choice is made for illustrative purposes and should not be interpreted as limiting the scope of the present disclosure in any way. Indeed, embodiments of the present disclosure may be applied to data arranged as pre-stack time migration gathers. Further, the data need not be arranged as midpoint gathers; rather, embodiments of the present disclosure may be applied to moveout-corrected or time-migrated shot gathers (each with a single source location and many receiver locations) or moveout-corrected or time-migrated receiver gathers (each with a single receiver location and many source locations).

Figure 4:
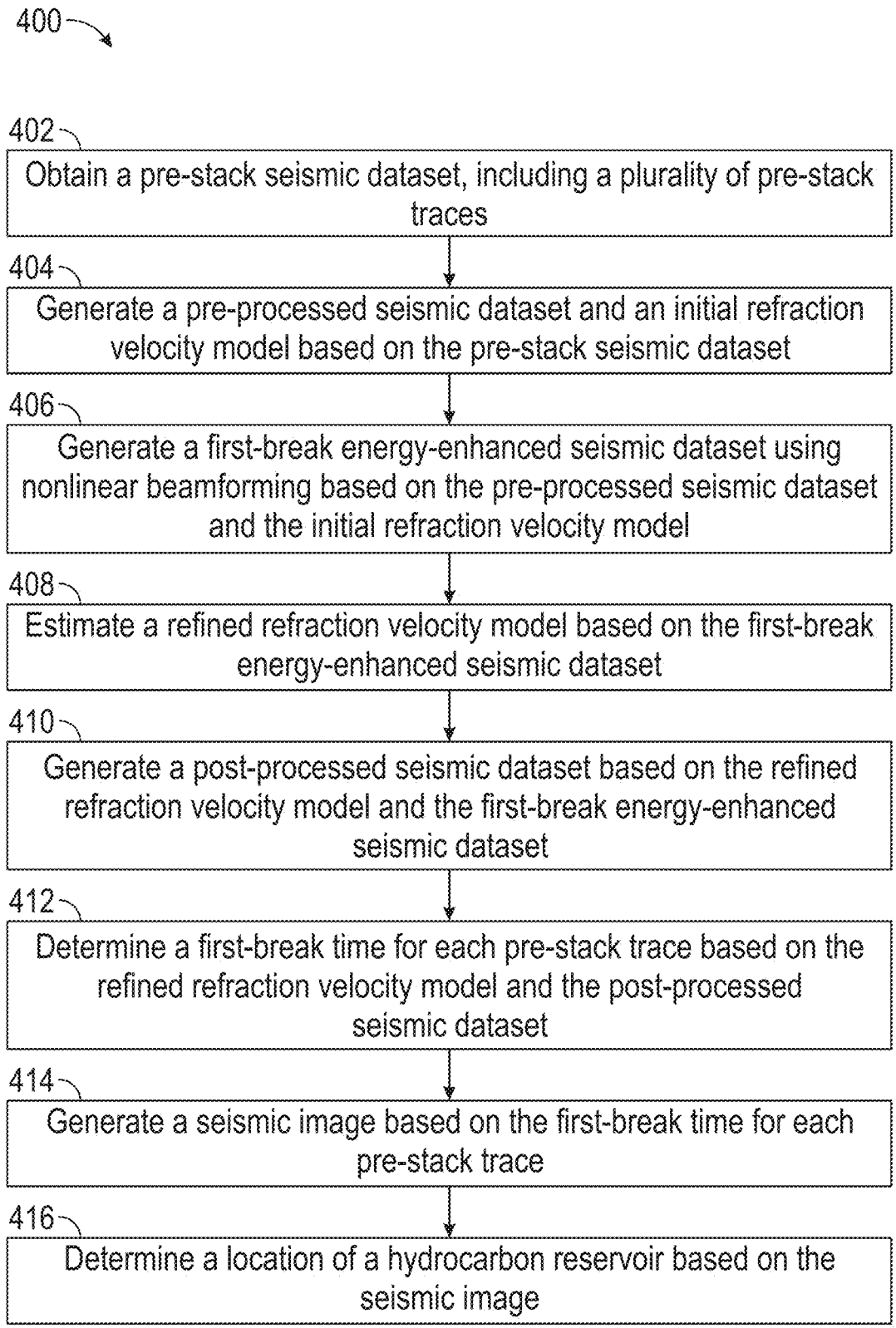
FIG. 4 shows a flowchart in accordance with one or more embodiments.

FIG. 4 shows a flowchart (400) in accordance with one or more embodiments. In Step 402 of the flowchart (400), a pre-stack seismic dataset may be obtained. The pre-stack seismic dataset may be acquired using a seismic survey (100) including a seismic source (106) and a plurality of seismic receivers (120). The seismic dataset may include a plurality of pre-stack gathers that may be shot gathers. The seismic survey may be conducted on a terrestrial surface, i.e., the seismic survey may be a "land" seismic survey. In some embodiments, the seismic dataset may also contain first-break times determined previously and stored within the digital data structure containing the seismic dataset, such as in the trace header.

In Step 404, in accordance with one or more embodiments, a pre-processed seismic dataset may be generated from the pre-stack seismic dataset. In some embodiments, the pre-processing may include noise attenuation, frequency filtering or amplitude balancing. However, in other embodiments other pre-processing steps familiar to a person of ordinary skill in the art may be added to, or substituted for, one or more of these processing steps without departing from the scope of the invention.

Further, in Step 404 an initial refraction velocity model may be generated from the pre-stack seismic dataset. The initial refraction velocity model may be generated using any manual or automated method familiar to a person of ordinary skill in the art, including cross-correlation, linear moveout, stacking, or auto-picking, without departing from the scope of the invention. In some embodiments, the first breaks stored in the trace header may be conditioned, e.g., smoothed, and then used in the generation of an initial refraction velocity model.

In Step 406, in accordance with one or more embodiments, a first-break energy-enhanced seismic dataset may be generated by performing nonlinear beamforming on the pre-processed seismic dataset. In some embodiments, a moveout corrected seismic dataset may be formed from pre-processed seismic data and an initial refraction velocity model prior to beamforming. After beamforming, the moveout correction may be reversed to produce a first-break energy-enhanced seismic dataset.

In Step 408, in accordance with one or more embodiments, a refined refraction velocity model may be estimated from the first-break energy-enhanced seismic dataset using automatic velocity detection or some other method familiar to one of ordinary skill in the art. Estimating the refined refraction velocity model may include moveout correction, cross-correlation, or interpolation. In some embodiments, the refined refraction velocity model and the initial refraction velocity model may be different velocity models; however, in other embodiments the refined refraction velocity model and the initial refraction velocity model may be the same velocity model.

In Step 410, in accordance with one or more embodiments, a post-processed seismic dataset may be generated from the first-break energy-enhanced seismic dataset and a post-processing sequence that may include noise attenuation, frequency filtering, amplitude balancing, or moveout correction. In some embodiments, post-processing may also include the application or removal of moveout correction using the refined refraction velocity model.

In Step 412, in accordance with one or more embodiments, a first-break time for each pre-stack trace may be determined from the post-processed seismic dataset. In some embodiments, the post-processed seismic dataset may be moveout corrected using the refined refraction velocity model.

In Step 414, in accordance with one or more embodiments, a seismic image may be generated based on first-break times. The first-break times may be used to determine statics corrections or be used in other capacities within the seismic processing workflow. The first-break times may also be used to derive or improve a seismic imaging velocity model, for example using seismic tomography methods familiar to one of ordinary skilling the art. In some embodiments, the seismic imaging velocity model may then be used as an input to, along with the processed seismic dataset, any migration algorithm familiar to one of ordinary skill in the art. In some embodiments, a post-stack migrated seismic image may be generated from the migrated seismic image by stacking (summing) over offset a plurality of midpoint gathers (350), each having an adjacent midpoint. The post-stack migrated seismic image may be used for geological interpretation or for seismic attribute analysis.

In Step 416, in accordance with one or more embodiments, a location of a hydrocarbon reservoir may be determined based on the seismic image. In some embodiments, the seismic image may be interpreted further using well information from the geological region of interest to identify a new hydrocarbon reservoir location. In some embodiments, the seismic image may be used to generate a geological model of the subsurface which may be used to identify new hydrocarbon reservoir locations. In other embodiments, the seismic image may be used to plan a wellbore path that intersects a hydrocarbon reservoir and to subsequently drill a wellbore guided by the wellbore path using techniques known to one of ordinary skill in the art. Seismic data conditioning may include the application of processes that improve the signal-to-noise ratio, or any process applied to the input data in order to obtain an improved result compared to the result that would have been achieved if that process had not been applied. For example, seismic data conditioning may include pre-processing steps such as noise attenuation. FIGS. 5A-11B depict seismic data at various stages of pre-processing, and the effect of applying various conditioning methods to the data. In each of FIGS. 5A-11B, the vertical axis (324) indicates the two-way travel time and the horizontal axis (310) indicates offset.

FIG. 5A shows a section of an input shot gather containing randomly distributed high amplitude noise. A person of ordinary skill in the art will appreciate the signal present as sloping lines dipping from right to left of FIG. 5A as indicated by solid arrows (502). In contrast, the noise, indicated by dotted arrows (504), has different or indistinguishable slopes. Randomly distributed high amplitude noise may be attenuated by applying a median or diversity amplitude mean filter to the data across divided frequency bands. Comparisons of amplitude or frequency content across different windows or sections of the shot gather, along with specified thresholds may be used to determine the difference between signal and noise. Further, these methods are not limited to data arranged as shot gathers and, for example, may be applied to receiver-gathers or common midpoint gathers with the seismic traces within the gather being randomly sorted. FIG. 5B shows the noise-attenuated shot gather, with solid arrows (502) indicating the signal is preserved in the noise attenuation step, which has improved the signal-to-noise ratio. The attenuated noise, indicated by dotted arrows (504), is present in FIG. 5C, which is the difference between the input shot gather and the noise-attenuated shot gather. It will be readily apparent to one of ordinary skill in the art that the noise-attenuated shot gather is noticeably less noisy than the input shot gather from which it was derived.

Figure 6C:
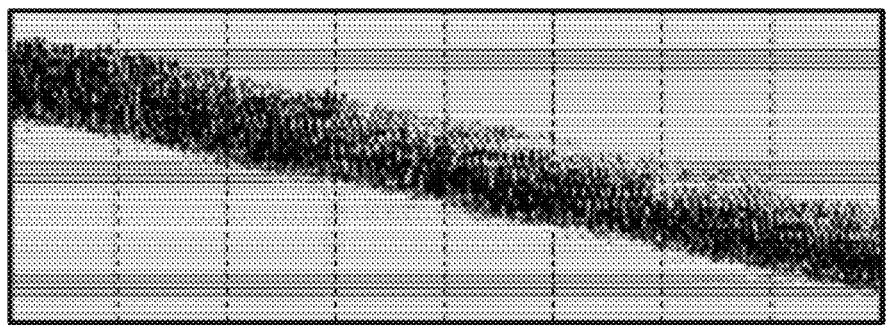
FIGS. 6A-6C show seismic datasets in accordance with one or more embodiments.
Figure 6B:
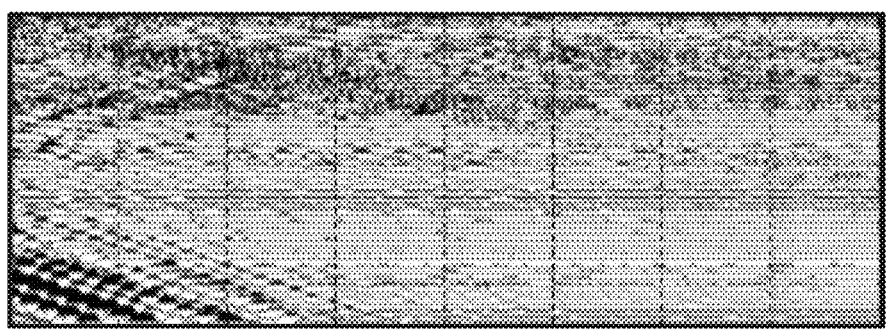
Figure 6A:
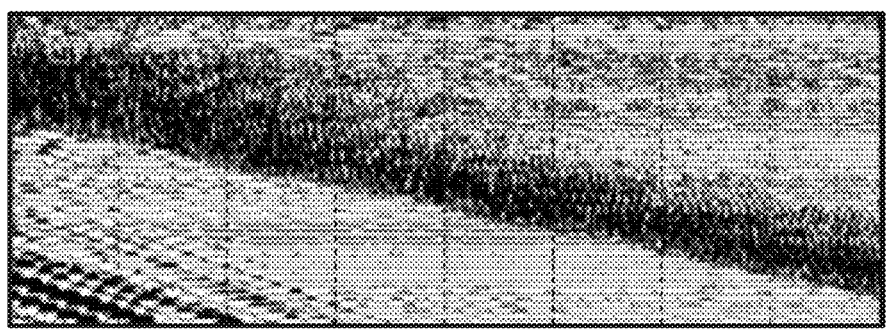

FIG. 6A shows a section of an input shot gather containing airblast noise. Airblasts are source-generated sonic waves that do not contain any information about the subsurface, as they travel only through the air before being recorded by the receivers. Sonic waves traveling through the air will be recorded by the receivers at lower apparent propagation velocities and will often have different frequency content and amplitudes than seismic waves traveling through the deep subsurface. Due to these characteristics, airblasts may also be attenuated by methods used for randomly distributed high amplitude noise. FIG. 6B is the shot gather after airblast noise attenuation. The attenuated airblast noise is present in the difference shot gather of FIG. 6C, which is the difference between the input shot gather and the airblast-attenuated shot gather of FIG. 6B. It will be readily apparent to one of ordinary skill in the art that the airblast-attenuated shot gather is noticeably less noisy than the input shot gather from which it was derived.

FIG. 7A shows a section of an input shot gather exhibiting high frequency random noise towards the larger offsets. High frequency noise may be caused by damaged or poorly installed ("coupled") seismic receivers, or human activity taking place near the seismic receivers such as power lines, or pump noise. The high frequency noise shown in the input shot gather indicated by dotted arrows (702), has a higher amplitude than the surrounding data within that frequency range and so may also be attenuated by methods used for randomly distributed high amplitude noise. In accordance with some embodiments, the average amplitude of lower frequencies than the noise is used as a reference amplitude to discriminate between signal and noise. FIG. 7B is the shot gather after high frequency noise attenuation. It will be readily apparent to one of ordinary skill in the art that the high-frequency-attenuated shot gather of FIG. 7B is noticeably less noisy than the input shot gather from which it was derived. FIG. 7C is the difference shot gather, the difference between the input shot gather and the high-frequency-attenuated shot gather. The attenuated high frequency noise is present in FIG. 7C, indicated by dotted arrows (702).

Figure 8C:
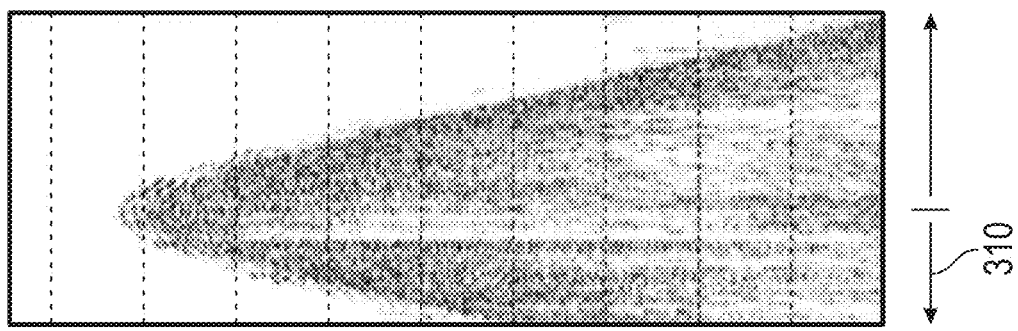
FIGS. 8A-8C show seismic datasets in accordance with one or more embodiments.
Figure 8B:
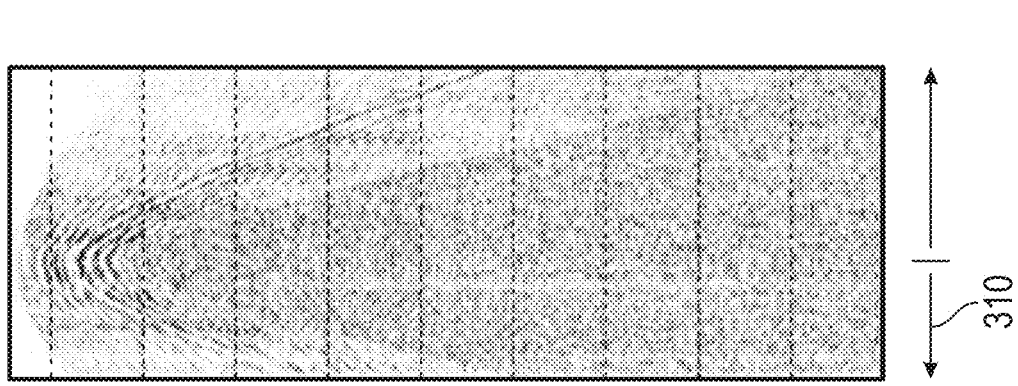
Figure 8A:
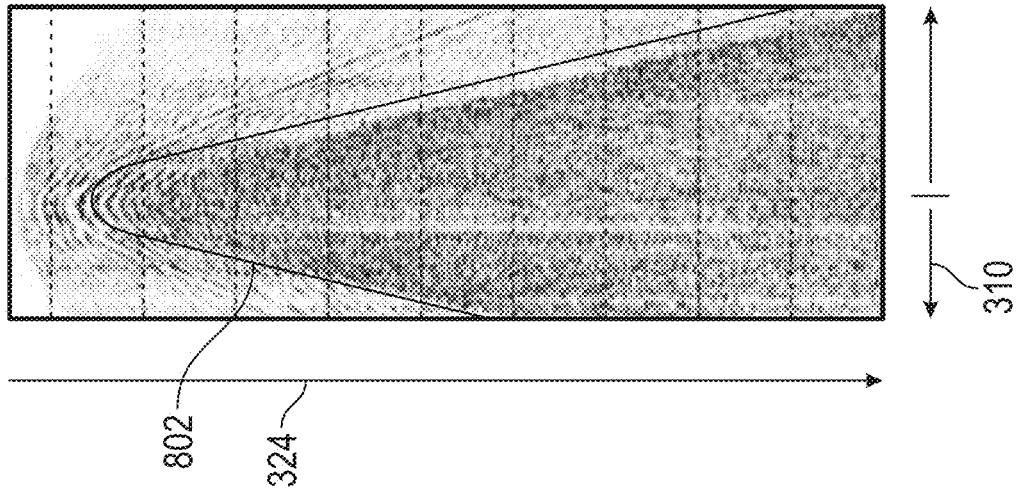

FIG. 8A shows an example of near-offset noise, in accordance with one or more embodiments. Near offset noise, such as Rayleigh waves or scattered waves, is common in land seismic data. Scattered waves occur when the radiated seismic wave encounters an inhomogeneity, often in the near-surface, and becomes distorted and deflects a plurality of directions. "Ground-roll", composed mainly of Rayleigh waves, are waves that travel along the very near-surface of the earth and are known for their low frequency and high amplitude character. Surface waves travel at lower velocities than reflected waves from the deeper subsurface, which means surface waves will be recorded as steeply sloping recorded energy limited to the near offsets. This trend forms a cone shape or a "noise cone" (802), shown in cross-section in input shot gather of FIG. 8A. FIG. 8B shows the noise-attenuated shot gather exhibiting attenuated energy within the noise cone (802). This may be achieved using similar methods to randomly distributed high amplitude noise attenuation, and for example, using reference amplitudes estimated from far offset traces (traces outside of the noise cone) to attenuate the noise. The difference shot gather, shown in FIG. 8C, is the difference between the input shot gather and noise-attenuated shot gather. FIG. 8C shows the surface wave noise that was attenuated within the noise cone (802).

FIG. 9A shows an input shot gather exhibiting weak ground-roll. Ground-roll, with its low frequency and high amplitude character relative to the surrounding data, may also be discriminated against using methods used for randomly distributed high amplitude noise, for example, by using reference amplitudes estimated from high frequencies in the input shot gather to scale the noise down. It will be readily apparent to one of ordinary skill in the art that the ground-roll-attenuated shot gather in FIG. 9B is noticeably less noisy than the input shot gather in FIG. 9A from which it was derived. The attenuated ground-roll is shown in FIG. 9C, the difference shot gather, which is the difference between the input shot gather and the ground-roll-attenuated shot gather.

FIG. 10A shows an input shot gather exhibiting strong linear noise. Stronger instances of ground-roll may present as coherent noise with linear moveout in a shot gather. Linear noise may be attenuated using dip filtering techniques, for example, frequency-wavenumber ("FK") filtering. FK filtering involves transforming recorded seismic data, which is acquired in the time and space domain ("time-space domain"), to the frequency and spatial wavenumber domain ("FK domain"). This transformation may be performed using a 2D Fourier transform. Working in a different seismic domain provides another arrangement of the data that may allow for more targeted filtering techniques. In some embodiments, small windows of data within a seismic gather can be transformed into the FK domain where noise may be removed using a mute, before transforming the noise-free data back to the time-space domain. In other embodiments, the noise itself may be isolated in the FK domain, creating a noise model, which is then transformed back to the time-space domain. The noise model may undergo further refinement in the time-space domain before subtraction, which may include an adaptive subtraction. In FIG. 10C, the difference between the input shot gather and the linear noise-attenuated shot gather (FIG. 10B) shows the noise removed by FK filtering. One of ordinary skill in the art will appreciate that the linear noise-attenuated gather is noticeably less noisy than the input shot gather from which it was derived.

Figure 11A:
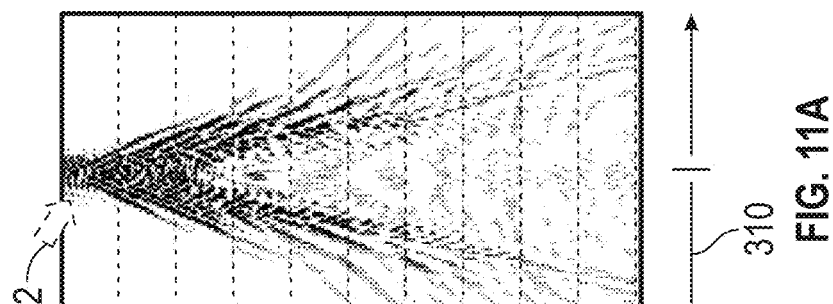
FIGS. 11A and 11B show seismic datasets in accordance with one or more embodiments.

FIG. 11A shows an example of amplitude variation across receivers within an input shot gather. The measured amplitude of a seismic wave may vary between adjacent seismic traces within a gather for many reasons. For example, the sensitivity or coupling of the seismic receivers may vary, or seismic waves may be absorbed differently by the subsurface depending on the path followed by the seismic waves. Amplitude balancing (sometimes termed "trace equalization"), may be used to remove amplitude variation, and in particular, to condition seismic data before first-break picking. Balancing the first-break energy amplitudes across adjacent traces within a gather may improve the first-break picking results. An example of an amplitude balancing method may include generating some measurement of amplitude within a window for each trace within a gather, and determining a scalar for each trace that normalizes its measured value to some average or pre-determined value. This described method of amplitude balancing is not meant to limit the invention; therefore, any other amplitude balancing method familiar to a person of ordinary skill in the art may be added or substituted without departing from the scope of this invention.

Figure 11B:
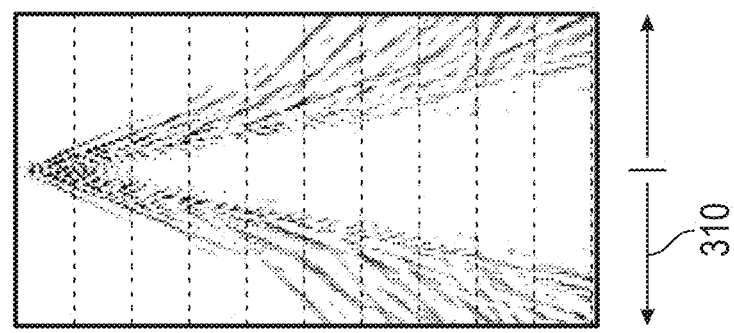

The amplitude-balanced shot gather in FIG. 11B shows a reduction in amplitude variation across the offsets when compared to the input shot gather of FIG. 11A. One of ordinary skill in the art will appreciate that the far offset amplitudes of the amplitude-balanced shot gather are more consistent with its near offset amplitudes than those of the input shot gather. Furthermore, the near-offset energy of the amplitude-balanced shot gather has been lowered relative to the far offset energy, which has reduced the noise above the first-break energy as indicated by the dotted arrow (1102).

In some embodiments, nonlinear beamforming or, in general, "beamforming", combines seismic energy from multiple traces into one or more traces by summing or stacking the multiple traces. The stacking may be a weighted sum of pre-stack traces and the resulting stacked trace may be normalized. Beamforming may be used to improve the continuity or signal-to-noise ratio of a particular seismic event or group of seismic events. Moveout correction may be applied near the beginning of the beamforming process to improve the beamformed result and may be reversed near the end of the process. The velocity model used in moveout correction may be manually picked or estimated through a number of methods familiar to one of ordinary skill in the art, without departing from the scope of the invention, and should relate to the slope of the seismic event targeted for beamforming.

FIGS. 12A and 12B show schematic representations of beamforming, in accordance with one or more embodiments. In particular, FIG. 12A shows a section of an input gather containing several pre-stack traces (1202). In each of FIGS. 12A-16C, the vertical axes (324) indicates the two-way travel time and the horizontal axis (310) indicates offset. For each target pre-stack trace (1204), a number of adjacent pre-stack traces defined by the summation aperture (1206) may be stacked along a computed trajectory to produce a beamformed, or stacked trace (1208) as shown in FIG. 12C. In FIG. 12A, the beamforming trajectory (1210) may be determined using signal processing tools such as cross-correlation performed within the search area (1212) or some other method. Other parameters such as dip and curvature constraints may be used, especially when targeting nonlinear seismic events such as hyperbolic events. In some embodiments, beamforming may be performed in multiple orthogonal spatial directions.

In FIG. 12A, the noise (1214) on the target pre-stack trace (1204) may contribute to an erroneous first-break picking result for this trace. The pre-stack traces (1202) adjacent to the target pre-stack trace (1204) do not all exhibit the same noise (1214) seen on the target pre-stack trace (1204). One of ordinary skill in the art will understand that stacking adjacent traces with similar signal character and differing noise character may result in an improved signal-to-noise ratio stacked trace (1208). In some embodiments, this stacked trace (1208) may or may not be normalized by using a function of the summation aperture (1206) or a function of amplitude measurements of each contributing pre-stack trace (1202). The beamforming process may be repeated for each of the remaining pre-stack traces (1202). When the beamforming trajectory (1210) is consistent with the slope of the first-break energy, the beamforming process may produce a seismic dataset with enhanced first-break energy.

In some embodiments, moveout correction may be applied to the input gather in FIG. 12A, generating the moveout corrected gather from FIG. 12B having moveout corrected pre-stack traces (1216) and a moveout corrected target pre-stack trace (1218). Applying moveout correction to the input gather of FIG. 12A may make the desired signal appear at approximately the same time on each moveout corrected pre-stack trace (1216) in FIG. 12B. A smaller moveout corrected search area (1220) and flatter moveout corrected beamforming trajectory (1222) may improve the efficiency and accuracy of the beamforming process.

FIGS. 13A-13C show an example of beamforming in accordance with one or more embodiments. FIG. 13A shows an input shot gather with continuous first-break energy (1302) in the near and far offsets. A first-break energy interval (1304) at the mid offsets presents an example of weak first-break energy on the input shot gather. FIG. 13B shows the beamformed shot gather which demonstrates the effect of beamforming to increase the continuity of the first-break energy as seen, for example, in the beamformed first-break energy interval (1306). One of ordinary skill in the art will appreciate that the signal-to-noise ratio in the beamformed shot gather) is higher than that of the input shot gather from which it was derived. In FIG. 13B, beamforming is targeted towards enhancing the first-break energy (1302), which is indicated in FIG. 13C, which is the difference between the input shot gather and the beamformed shot gather. FIG. 13C contains noise, indicated by dotted arrows (1308), and signal, indicated by solid arrows (1310), the trajectories of which neither are consistent with the first-break energy beamforming trajectories (1312).

Figure 14B:
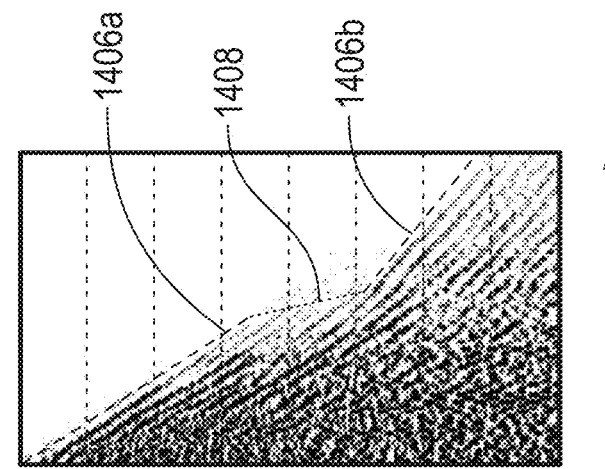
FIGS. 14A and 14B show an example of automatic velocity detection in accordance with one or more embodiments.
Figure 14A:
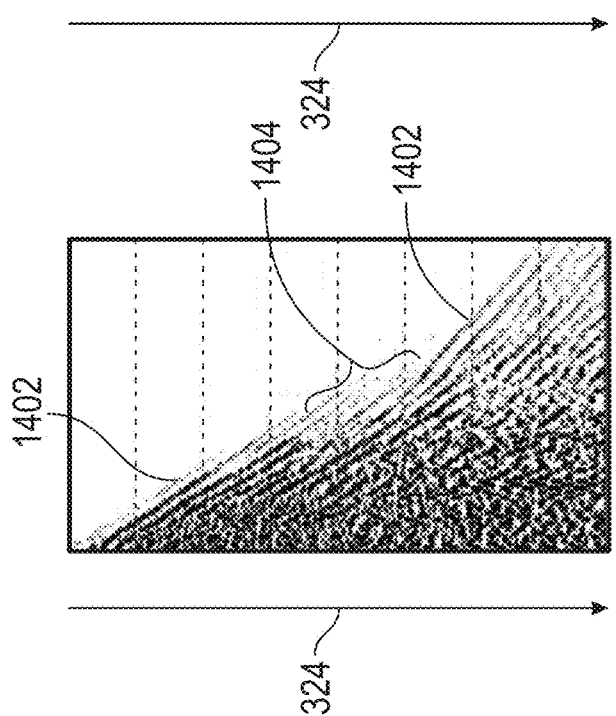

FIGS. 14A and 14B show an example of automatic velocity detection in accordance with one or more embodiments. Specifically, FIG. 14A depicts a section of a shot gather with first-break energy (1402) having distinct slopes at near and far offsets. The slopes of the first-break energy (1402) may be estimated using automatic velocity detection. In some embodiments, automatic velocity detection uses cross-correlation of adjacent traces within a seismic gather to compute the time lag between a seismic event present in both seismic traces. Combining the time lag information along with the spatial positions of each trace may yield an automatically detected velocity.

In FIG. 14A, the mid-offset interval (1404) shows an example of first-break energy where the slope is not evident. In some embodiments, an interval containing seismic traces with weak first-break energy may produce an unsatisfactory correlation with adjacent seismic traces. For example, the cross-correlated trace may indicate a time lag larger than some allowable amount or may have amplitude values lower than some allowable amount. Interpolation or some other method may be used to estimate velocities within such an interval.

FIG. 14B depicts the same section of the shot gather from FIG. 14A, with three distinct sloping lines plotted, indicating seismic velocities. The first sloping line (1406a) represents a velocity of approximately 2800 m/s over the near offsets, and the second sloping line (1406b) represents a velocity of approximately 5600 m/s over the far offsets. The first and second sloping lines (1406a, 1406b) were derived using automatic velocity detection. The third sloping line (1408) representing a velocity of approximately 600 m/s in the mid offsets was derived by interpolating between the first and second sloping lines (1406a, 1406b) across the mid-offset interval (1404). The automatically detected or interpolated velocities for each offset interval may be combined to create a refined refraction velocity model useful for post-processing and first-break picking.

In some embodiments, moveout correction using an initial velocity model may be applied before automatic velocity detection. The initial velocity model may not be an accurate representation of the true velocity of the targeted event, and the difference between the initial velocity model and true velocity model, a "residual velocity model" may be determined. Cross-correlation lags may be used to determine a residual velocity model. A residual velocity model may then be combined with an initial velocity model during automatic velocity detection to create a refined velocity model. Using conditioned data that has undergone processes such as noise attenuation and beamforming may result in more accurate velocity estimation when using automatic velocity detection. Specifically, automatic velocity detection of first-break energy may benefit from a first-break energy-enhanced dataset FIGS. 15A and 15B show an example of post-processing in accordance with one or more embodiments. In FIG. 15A, a single input shot gather has undergone data conditioning such as noise attenuation and beamforming to enhance the signal-to-noise ratio and continuity of the first-break energy. FIG. 15B shows the post-processed shot gather, which has undergone additional processing in order to further enhance the first-break energy. Areas of enhanced first-break energy (1502) are indicated on the post-processed shot gather. Post-processing may include techniques such as random noise attenuation, amplitude balancing, frequency filtering, or other data conditioning processes. In some embodiments, these techniques may be coupled with moveout correction using a refined velocity model that may improve the signal-to-noise ratio of the intended seismic signal for automatic picking.

FIGS. 16A-16C show an example of Steps 402 through 412 of the flowchart (400) from FIG. 4. In particular, FIG. 16A depicts a raw input shot gather with random noise contaminating several receivers indicated by the dotted arrows (1602), and with both random and coherent noise within the noise cone (802). FIG. 16B shows the conditioned shot gather, which has undergone pre-processing, beamforming, automatic velocity detection, and post-processing. One of ordinary skill in the art would appreciate that the signal-to-noise ratio in the conditioned shot gather has increased and that the first-break energy has been enhanced when compared to the raw input shot gather of FIG. 16A. Further, where the raw input shot gather shows a section of weak first-break energy (1604), the conditioned shot gather shows recovered first-break energy (1606) in the same offset section.

Further, FIG. 16C shows the first-break times (1608) determined from the conditioned shot gather of FIG. 16B using an auto-picker. One of ordinary skill in the art would appreciate that first-break times determined from the raw input shot gather using an auto-picker would be less accurate than first-break times derived from the conditioned shot gather. In some embodiments, to determine a first-break time, automatic first-break picking algorithms may use local amplitude ratios and 2D horizontal tracking, or more advanced techniques may use artificial intelligence or machine learning. In some embodiments, the first-break energy may be aligned at a specified time, for example 500 ms, with moveout correction using an initial or refined refraction velocity model.

Figure 17:
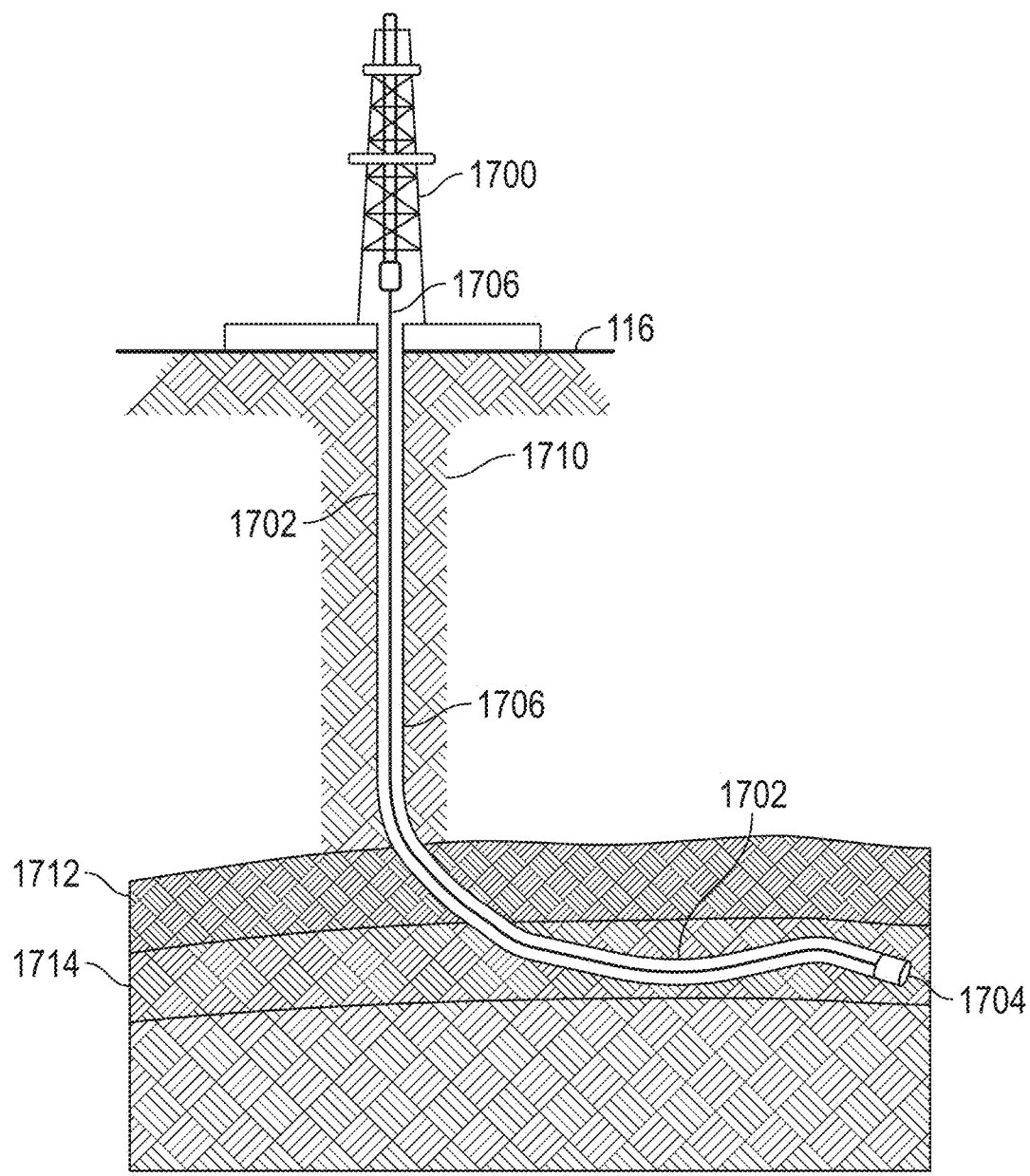
FIG. 17 shows a drilling system in accordance with one or more embodiments.

FIG. 17 illustrates systems in accordance with one or more embodiments. As shown in FIG. 17, a wellbore path (1702) may be drilled by a drill bit (1704) attached by a drillstring (1706) to a drill rig (1700) located on the Earth's surface (116). The wellbore may traverse a plurality of overburden layers (1710) and one or more cap-rock layers (1712) to a hydrocarbon reservoir (1714). In accordance with one or more embodiments, the seismic image may be used to plan and drill a wellbore path (1702). The wellbore path (1702) may be a curved wellbore path, or a straight wellbore path. All or part of the wellbore path (1702) may be vertical, and some wellbore paths may be deviated or have horizontal sections.

The seismic image may be used, together with other available information, to determine the location of a hydrocarbon reservoir within a subterranean region of interest with a high degree of certainty. Further, the seismic image may be used to determine locations within a hydrocarbon reservoir for which wellbores may be drilled, safely and economically, to produce the hydrocarbons.

Prior to the commencement of drilling, a wellbore path plan may be generated. The wellbore path plan may include a starting surface location of the wellbore, or a subsurface location within an existing wellbore, from which the wellbore may be drilled. Further, the wellbore path plan may include a terminal location that may intersect with the targeted hydrocarbon bearing formation and a planned wellbore path from the starting location to the terminal location.

Typically, the wellbore path plan is generated based on best available information from a geophysical model, geomechanical models encapsulating subterranean stress conditions, the trajectory of any existing wellbores (which it may be desirable to avoid), and the existence of other drilling hazards, such as shallow gas pockets, over-pressure zones, and active fault planes. Furthermore, the wellbore path plan may take into account other engineering constraints such as the maximum wellbore curvature ("dog-log") that the drillstring may tolerate and the maximum torque and drag values that the drilling system may tolerate.

A wellbore path planning system may be used to generate the wellbore path plan. The wellbore path planning system may comprise one or more computer processors in communication with computer memory containing the geophysical and geomechanical models, information relating to drilling hazards, and the constraints imposed by the limitations of the drillstring and the drilling system. The wellbore path planning system may run on a computer system (1802) in FIG. 18 (described below) or on any other suitable computer system co-located with or remote from computer system (1802). The wellbore path planning system may further include dedicated software to determine the planned wellbore path and associated drilling parameters, such as the planned wellbore diameter, the location of planned changes of the wellbore diameter, the planned depths at which casing will be inserted to support the wellbore and to prevent formation fluids entering the wellbore, and the drilling mud weights (densities) and types that may be used during drilling the wellbore.

Turning back to FIG. 17, a wellbore may be drilled using a drill rig (1700) that may be situated on a land drill site, an offshore platform, such as a jack-up rig, a semi-submersible, or a drill ship. The drill rig (1700) may be equipped with a hoisting system, which can raise or lower the drillstring and other tools required to drill the well. The drillstring may include one or more drill pipes connected to form conduit and a bottom hole assembly (BHA) disposed at the distal end of the drillstring. The BHA may include a drill bit (1704) to cut into subsurface rock. The BHA may further include measurement tools, such as a measurement-while-drilling (MWD) tool and logging-while-drilling (LWD) tool. MWD tools may include sensors and hardware to measure downhole drilling parameters, such as the azimuth and inclination of the drill bit, the weight-on-bit, and the torque. The LWD measurements may include sensors, such as resistivity, gamma ray, and neutron density sensors, to characterize the rock formation surrounding the wellbore. Both MWD and LWD measurements may be transmitted to the surface using any suitable telemetry system, such as mud-pulse or wired-drill pipe, known in the art.

To start drilling, or "spudding in" the well, the hoisting system lowers the drillstring suspended from the drill rig towards the planned surface location of the wellbore. An engine, such as a diesel engine, may be used to rotate the drillstring. The weight of the drillstring combined with the rotational motion enables the drill bit to bore the wellbore.

The near-surface is typically made up of loose or soft sediment or rock, so large diameter casing, e.g. "base pipe" or "conductor casing", is often put in place while drilling to stabilize and isolate the wellbore. At the top of the base pipe is the wellhead, which serves to provide pressure control through a series of spools, valves, or adapters. Once near-surface drilling has begun, water or drill fluid may be used to force the base pipe into place using a pumping system until the wellhead is situated just above the surface of the earth.

Drilling may continue without any casing once deeper more compact rock is reached. While drilling, drilling mud may be injected from the surface through the drill pipe. Drilling mud serves various purposes, including pressure equalization, removal of rock cuttings, or drill bit cooling and lubrication. At planned depth intervals, drilling may be paused and the drillstring withdrawn from the wellbore. Sections of casing may be connected and inserted and cemented into the wellbore. Casing string may be cemented in place by pumping cement and mud, separated by a "cementing plug", from the surface through the drill pipe. The cementing plug and drilling mud force the cement through the drill pipe and into the annular space between the casing and the wellbore wall. Once the cement cures drilling may recommence. The drilling process is often performed in several stages. Therefore, the drilling and casing cycle may be repeated more than once, depending on the depth of the wellbore and the pressure on the wellbore walls from surrounding rock. Due to the high pressures experienced by deep wellbores, a blowout preventer (BOP) may be installed at the wellhead to protect the rig and environment from unplanned oil or gas releases. As the wellbore becomes deeper, both successively smaller drill bits and casing string may be used. Drilling deviated or horizontal wellbores may require specialized drill bits or drill assemblies.

A drilling system may be disposed at and communicate with the well site. The drilling system may control at least a portion of a drilling operation at the well site by providing controls to various components of the drilling operation. In one or more embodiments, the system may receive data from one or more sensors arranged to measure controllable parameters of the drilling operation. As a non-limiting example, sensors may be arranged to measure WOB (weight on bit), RPM (drill rotational speed), GPM (flow rate of the mud pumps), and ROP (rate of penetration of the drilling operation). Each sensor may be positioned or configured to measure a desired physical stimulus. Drilling may be considered complete when a target zone is reached, or the presence of hydrocarbons is established.

Figure 18:
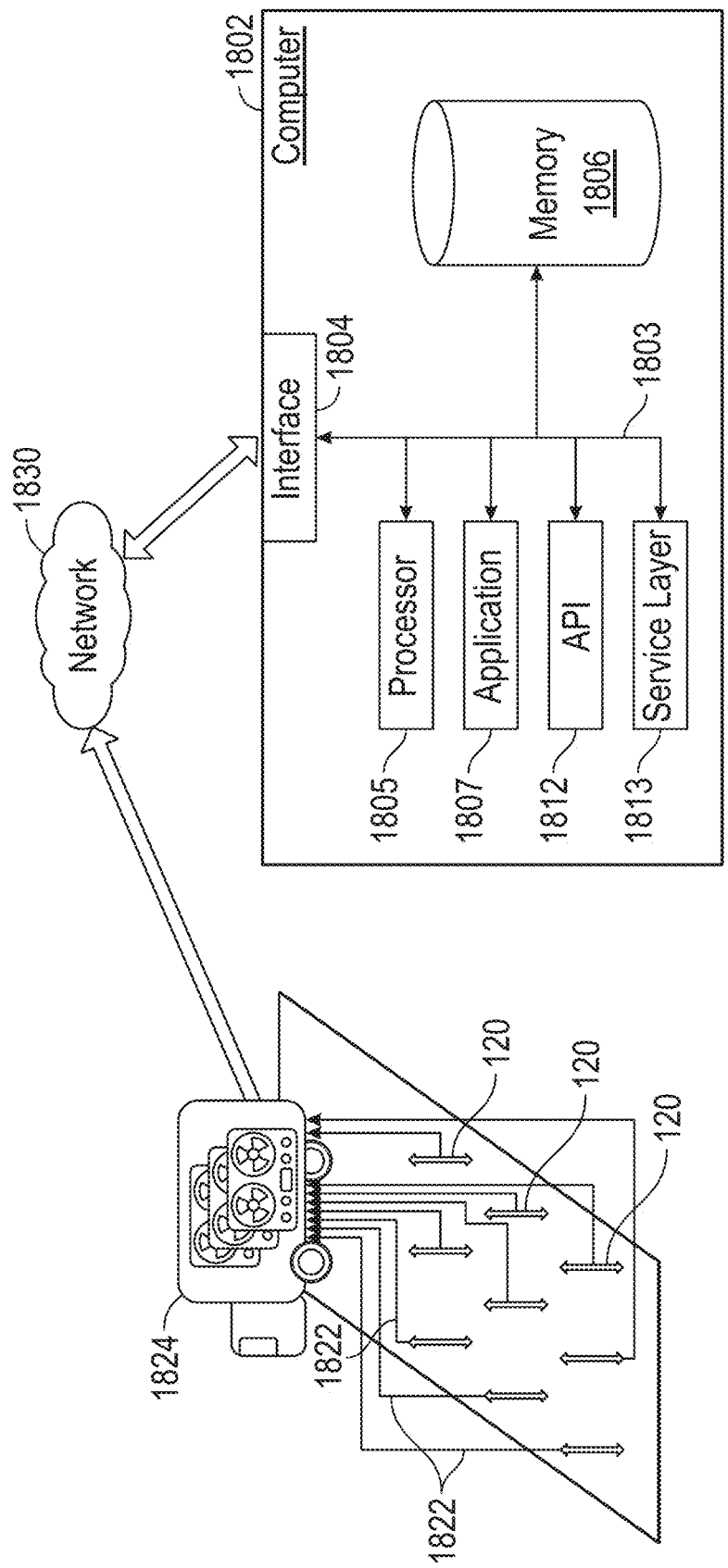
FIG. 18 shows a system in accordance with one or more embodiments.

FIG. 18 shows a seismic recording and processing system in accordance with one or more embodiments. The data recorded by a plurality of seismic receivers (120) may be transmitted to a seismic recording facility (1824). The seismic recording facility (1824) is often located in the vicinity of the seismic survey (100) but may be located remotely provided adequate communication bandwidth is available. The seismic recording facility may be one or more seismic recording trucks. The plurality of seismic receivers (120) may be in digital or analog telecommunication with the seismic recording facility (1824). The telecommunication may be performed over telemetry channels (1822) that may be electrical cables, such as coaxial cables, or may be performed wireless using wireless systems, such as Wi-Fi or Bluetooth. Digitization of the seismic data may be performed at each seismic receiver (120), or at the seismic recording facility (1824), or at an intermediate telemetry node (not shown) between the seismic receiver (120) and the seismic recording facility (1824).

The seismic data may be recorded at the seismic recording facility (1824) and stored on non-transitory computer memory. The computer memory may be one or more computer hard-drives, or one or more computer memory tapes, or any other convenient computer memory media familiar to one of ordinary skill in the art, without departing from the scope of the invention. The seismic data may be transmitted to a computer (1802) for processing. The computer (1802) may be located in or near the seismic recording facility (1824) or may be located at a remote location, that may be in another city, country, or continent. The seismic data may be transmitted from the seismic recording facility (1824) to a computer (1802) for processing. The transmission may occur over a network (1830) that may be a local area network using an ethernet or Wi-Fi system, or alternatively the network (1830) may be a wide area network using an internet or intranet service. Alternatively, seismic data may be transmitted over a network (1830) using satellite communication networks. Most commonly, because of its size, seismic data may be transmitted by physically transporting the computer memory, such as computer tapes or hard drives, in which the seismic data is stored from the seismic recording facility (1824) to the location of the computer (1802) to be used for processing.

FIG. 18 further depicts a block diagram of a computer system (1802) used to provide computational functionalities associated with described algorithms, methods, functions, processes, flows, and procedures as described in this disclosure, according to one or more embodiments. The illustrated computer (1802) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1802) may include a computer that includes an input device, such as a keypad, keyboard, touch screen, or other device that can accept user information, and an output device that conveys information associated with the operation of the computer (1802), including digital data, visual, or audio information (or a combination of information), or a GUI.

The computer (1802) can serve in a role as a client, network component, a server, a database or other persistency, or any other component (or a combination of roles) of a computer system for performing the subject matter described in the instant disclosure. The illustrated computer (1802) is communicably coupled with a network (1830). In some implementations, one or more components of the computer (1802) may be configured to operate within environments, including cloud-computing-based, local, global, or other environment (or a combination of environments).

At a high level, the computer (1802) is an electronic computing device operable to receive, transmit, process, store, or manage data and information associated with the described subject matter. According to some implementations, the computer (1802) may also include or be communicably coupled with an application server, e-mail server, web server, caching server, streaming data server, business intelligence (BI) server, or other server (or a combination of servers).

The computer (1802) can receive requests over network (1830) from a client application (for example, executing on another computer (1802) and responding to the received requests by processing the said requests in an appropriate software application. In addition, requests may also be sent to the computer (1802) from internal users (for example, from a command console or by other appropriate access method), external or third-parties, other automated applications, as well as any other appropriate entities, individuals, systems, or computers.

Each of the components of the computer (1802) can communicate using a system bus (1803). In some implementations, any or all of the components of the computer (1802), both hardware or software (or a combination of hardware and software), may interface with each other or the interface (1804) (or a combination of both) over the system bus (1803) using an application programming interface (API) (1812) or a service layer (1813) (or a combination of the API (1812) and service layer (1813). The API (1812) may include specifications for routines, data structures, and object classes. The API (1812) may be either computer-language independent or dependent and refer to a complete interface, a single function, or even a set of APIs. The service layer (1813) provides software services to the computer (1802) or other components (whether or not illustrated) that are communicably coupled to the computer (1802). The functionality of the computer (1802) may be accessible for all service consumers using this service layer. Software services, such as those provided by the service layer (1813), provide reusable, defined business functionalities through a defined interface. For example, the interface may be software written in JAVA, C++, or other suitable language providing data in extensible markup language (XML) format or another suitable format. While illustrated as an integrated component of the computer (1802), alternative implementations may illustrate the API (1812) or the service layer (1813) as stand-alone components in relation to other components of the computer (1802) or other components (whether or not illustrated) that are communicably coupled to the computer (1802). Moreover, any or all parts of the API (1812) or the service layer (1813) may be implemented as child or sub-modules of another software module, enterprise application, or hardware module without departing from the scope of this disclosure.

The computer (1802) includes an interface (1804). Although illustrated as a single interface (1804) in FIG. 18, two or more interfaces (1804) may be used according to particular needs, desires, or particular implementations of the computer (1802). The interface (1804) is used by the computer (1802) for communicating with other systems in a distributed environment that are connected to the network (1830). Generally, the interface (1804) includes logic encoded in software or hardware (or a combination of software and hardware) and operable to communicate with the network (1830). More specifically, the interface (1804) may include software supporting one or more communication protocols associated with communications such that the network (1830) or interface's hardware is operable to communicate physical signals within and outside of the illustrated computer (1802).

The computer (1802) includes at least one computer processor (1805). Although illustrated as a single computer processor (1805) in FIG. 18, two or more processors may be used according to particular needs, desires, or particular implementations of the computer (1802). Generally, the computer processor (1805) executes instructions and manipulates data to perform the operations of the computer (1802) and any algorithms, methods, functions, processes, flows, and procedures as described in the instant disclosure.

The computer (1802) also includes a memory (1806) that holds data for the computer (1802) or other components (or a combination of both) that can be connected to the network (1830). For example, memory (1806) can be a database storing data consistent with this disclosure. Although illustrated as a single memory (1806) in FIG. 18, two or more memories may be used according to particular needs, desires, or particular implementations of the computer (1802) and the described functionality. While memory (1806) is illustrated as an integral component of the computer (1802), in alternative implementations, memory (1806) can be external to the computer (1802).

The application (1807) is an algorithmic software engine providing functionality according to particular needs, desires, or particular implementations of the computer (1802), particularly with respect to functionality described in this disclosure. For example, application (1807) can serve as one or more components, modules, applications, etc. Further, although illustrated as a single application (1807), the application (1807) may be implemented as multiple applications (1807) on the computer (1802). In addition, although illustrated as integral to the computer (1802), in alternative implementations, the application (1807) can be external to the computer (1802).

There may be any number of computers (1802) associated with, or external to, a computer system containing computer (1802), wherein each computer (1802) communicates over network (1830). Further, the term "client," "user," and other appropriate terminology may be used interchangeably as appropriate without departing from the scope of this disclosure. Moreover, this disclosure contemplates that many users may use one computer (1802), or that one user may use multiple computers (1802).

In some embodiments, seismic processing such as Steps 402-414 of FIG. 4 may be conducted using a first computer (1802) and one or more first Applications (1807) while seismic image analysis, such as Step 416 of FIG. 4, may be conducted on a second computer (1802) using one or more second Applications (1807).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method, comprising:
    obtaining a pre-stack seismic dataset, wherein the pre-stack seismic dataset comprises a plurality of pre-stack traces;
    generating, using a computer processor, a pre-processed seismic dataset and an initial refraction velocity model, based, at least in part, on the pre-stack seismic dataset;
    generating, using the computer processor, a first-break energy-enhanced seismic dataset using nonlinear beamforming based, at least in part, on the pre-processed seismic dataset and the initial refraction velocity model;
    estimating, using the computer processor, a refined refraction velocity model based, at least in part, on the first-break energy-enhanced seismic dataset;
    generating, using the computer processor, a post-processed seismic dataset based, at least in part, on the refined refraction velocity model and the first-break energy-enhanced seismic dataset;
    determining, using the computer processor, a first-break time for each pre-stack trace based, at least in part, on the refined refraction velocity model and the post-processed seismic dataset;
    generating, using the computer processor, a seismic image based, at least in part, on the first-break time for each pre-stack trace; and
    determining a location of a hydrocarbon reservoir based, at least in part, on the seismic image.

2. The method of claim 1, wherein pre-processing comprises noise attenuation, frequency filtering or amplitude balancing.

3. The method of claim 1, wherein nonlinear beamforming comprises:
    determining an initial refraction velocity model based on the pre-stack seismic dataset;

forming a moveout-correct seismic dataset based on the pre-stack seismic dataset and the initial refraction velocity model using moveout correction;

determining a beamformed seismic dataset based on the moveout-correct seismic dataset by performing beamforming over at least one spatial direction; and determining a first-break energy-enhanced seismic dataset from the beamformed seismic dataset by reversing the moveout correction.

4. The method of claim 1, wherein estimating the refined refraction velocity model comprises moveout correction, cross-correlation, or interpolation.

5. The method of claim 1, wherein post-processing comprises linear moveout correction, noise attenuation, frequency filtering, or amplitude balancing.

6. The method of claim 1, wherein determining the first-break time for each pre-stack trace comprises performing automatic picking on linear moveout corrected data using the refined refraction velocity model.

7. The method of claim 1, further comprising:
planning a wellbore path to intersect the hydrocarbon reservoir; and
drilling a wellbore guided by the wellbore path.

8. A non-transitory computer readable medium storing a set of instructions, executable by a computer processor, the set of instructions comprising functionality for:
receiving a pre-stack seismic dataset, wherein the pre-stack seismic dataset comprises a plurality of pre-stack traces;
generating a pre-processed seismic dataset and an initial refraction velocity model based, at least in part, on the pre-stack seismic dataset;
generating a first-break energy-enhanced seismic dataset using nonlinear beamforming based, at least in part, on the pre-processed seismic dataset and the initial refraction velocity model;
estimating a refined refraction velocity model based, at least in part, on the first-break energy-enhanced seismic dataset;
generating a post-processed seismic dataset based, at least in part, on the refined refraction velocity model and the first-break energy-enhanced seismic dataset;
determining a first-break time for each pre-stack trace based, at least in part, on the refined refraction velocity model and the post-processed seismic dataset;
generating a seismic image based, at least in part, on the first-break time for each pre-stack trace; and
determining a location of a hydrocarbon reservoir based, at least in part, on the seismic image.

9. The non-transitory computer readable medium of claim 8, wherein pre-processing comprises noise attenuation, frequency filtering or amplitude balancing.

10. The non-transitory computer readable medium of claim 8, wherein nonlinear beamforming comprises:
determining an initial refraction velocity model based on the pre-stack seismic dataset;
forming a moveout-correct seismic dataset based on the pre-stack seismic dataset and the initial refraction velocity model using moveout correction;
determining a beamformed seismic dataset based on the moveout-correct seismic dataset by performing beamforming over at least one spatial direction; and
determining a first-break energy-enhanced seismic dataset from the beamformed seismic dataset by reversing the moveout correction.

11. The non-transitory computer readable medium of claim 8, wherein estimating the refined refraction velocity model comprises moveout correction, cross-correlation, or interpolation.

12. The non-transitory computer readable medium of claim 8, wherein post-processing comprises linear moveout correction, noise attenuation, frequency filtering, or amplitude balancing.

13. The non-transitory computer readable medium of claim 8, wherein determining the first-break time for each pre-stack trace comprises performing automatic picking on linear moveout corrected data using the refined refraction velocity model.

14. The non-transitory computer readable medium of claim 8, the set of instructions further comprising planning a wellbore path to intersect the hydrocarbon reservoir.

15. A system, comprising:
a seismic acquisition system configured to acquire a pre-stack seismic dataset, wherein the pre-stack seismic dataset comprises a plurality of pre-stack traces; and
a seismic processor, configured to:
generate a pre-processed seismic dataset and an initial refraction velocity model based, at least in part, on the pre-stack seismic dataset;
generate a first-break energy-enhanced seismic dataset using nonlinear beamforming based, at least in part, on the pre-processed seismic dataset and the initial refraction velocity model;
estimate a refined refraction velocity model based, at least in part, on the first-break energy-enhanced seismic dataset;
generate a post-processed seismic dataset based, at least in part, on the refined refraction velocity model and the first-break energy-enhanced seismic dataset;
determine a first-break time for each pre-stack trace based, at least in part, on the refined refraction velocity model and the post-processed seismic dataset;
generate a seismic image based, at least in part, on the first-break time for each pre-stack trace; and
determine a location of a hydrocarbon reservoir based, at least in part, on the seismic image.

16. The system of claim 15, wherein nonlinear beamforming comprises:
determining an initial refraction velocity model based on the pre-stack seismic dataset;
forming a moveout-correct seismic dataset based on the pre-stack seismic dataset and the initial refraction velocity model using moveout correction;
determining a beamformed seismic dataset based on the moveout-correct seismic dataset by performing beamforming over at least one spatial direction; and
determining a first-break energy-enhanced seismic dataset from the beamformed seismic dataset by reversing the moveout correction.

17. The system of claim 15, wherein estimating the refined refraction velocity model comprises moveout correction, cross-correlation, or interpolation.

18. The system of claim 15, wherein post-processing comprises linear moveout correction, noise attenuation, frequency filtering, or amplitude balancing.

19. The system of claim 15, wherein determining the first-break time for each pre-stack trace comprises performing automatic picking on linear moveout corrected data using the refined refraction velocity model.

20. The system of claim 15, further comprising:
a wellbore path planning system configured to plan a wellbore path to intersect the hydrocarbon reservoir; and
a wellbore drilling system configured to drill a wellbore guided by the wellbore path.

* * * * *